(12) United States Patent
Ozawa

(10) Patent No.: US 7,865,009 B2
(45) Date of Patent: Jan. 4, 2011

(54) MAGNETIC INK CHARACTER READING APPARATUS

(75) Inventor: Masamitsu Ozawa, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 798 days.

(21) Appl. No.: 11/845,870

(22) Filed: Aug. 28, 2007

(65) Prior Publication Data

US 2008/0056554 A1    Mar. 6, 2008

(30) Foreign Application Priority Data

Aug. 31, 2006   (JP) ............................. 2006-234990

(51) Int. Cl.
*G06K 9/00* (2006.01)
(52) U.S. Cl. ...................... 382/139; 235/449
(58) Field of Classification Search .............. 382/139, 382/140; 705/45; 235/449
See application file for complete search history.

(56) References Cited

U.S. PATENT DOCUMENTS

| | | | | |
|---|---|---|---|---|
| 4,399,553 A | * | 8/1983 | Toyama | ................... 382/139 |
| 4,984,281 A | * | 1/1991 | Matsuhashi et al. | ......... 382/139 |
| 5,959,279 A | * | 9/1999 | Komatsu | ..................... 235/449 |
| 6,621,920 B1 | * | 9/2003 | Koike | ......................... 382/139 |
| 6,956,962 B1 | * | 10/2005 | Hayosh | ...................... 382/139 |
| 7,103,438 B2 | * | 9/2006 | Hallowell et al. | ........... 700/116 |
| 2005/0025362 A1 | * | 2/2005 | Blair et al. | .................. 382/182 |
| 2006/0043182 A1 | * | 3/2006 | Kinoshita | ................... 235/449 |

* cited by examiner

*Primary Examiner*—Samir A. Ahmed
(74) *Attorney, Agent, or Firm*—Pearne & Gordon LLP

(57) ABSTRACT

In the magnetic ink character reading apparatus, a first determination section reads signal data sequentially from a signal data string corresponding to the output signals of a magnetic head and determines whether the signal data corresponds to a predetermined signal. A second determination section determines whether the determination results by the first determination section is obtained successively for at least a predetermined number of signal data. A determination counter section counts the number of times (count) the successive acquisition of the determination results each telling the disagreement of the signal data with the predetermined signal over at least the predetermined number of signal data has been confirmed by the second determination section. A character recognition processing execution limit section limits the execution of the character recognition processing according to the count result provided by the determination counter section.

5 Claims, 15 Drawing Sheets

FIG. 2
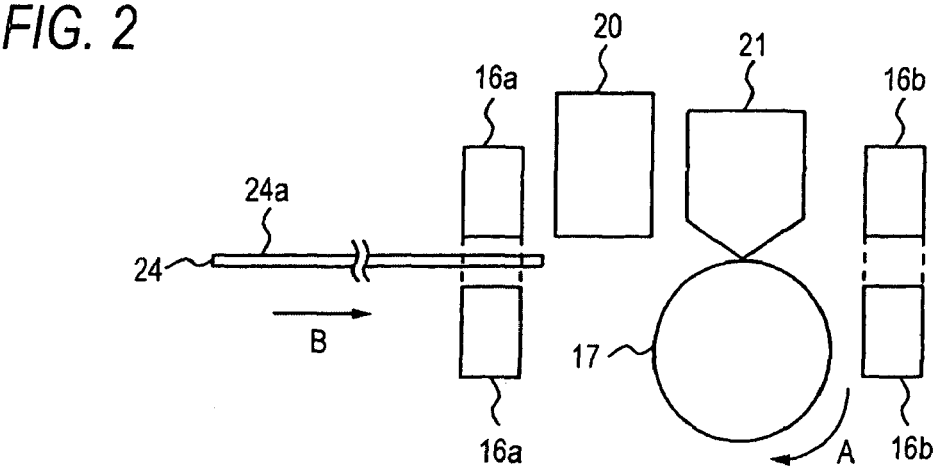
FIG. 3A
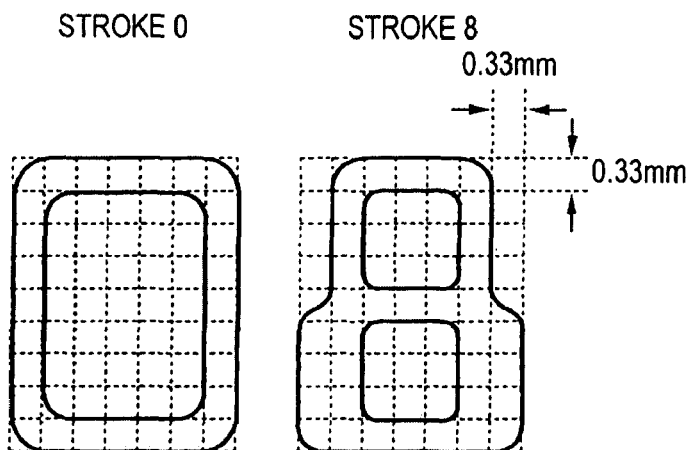
FIG. 3B
FIG. 3C
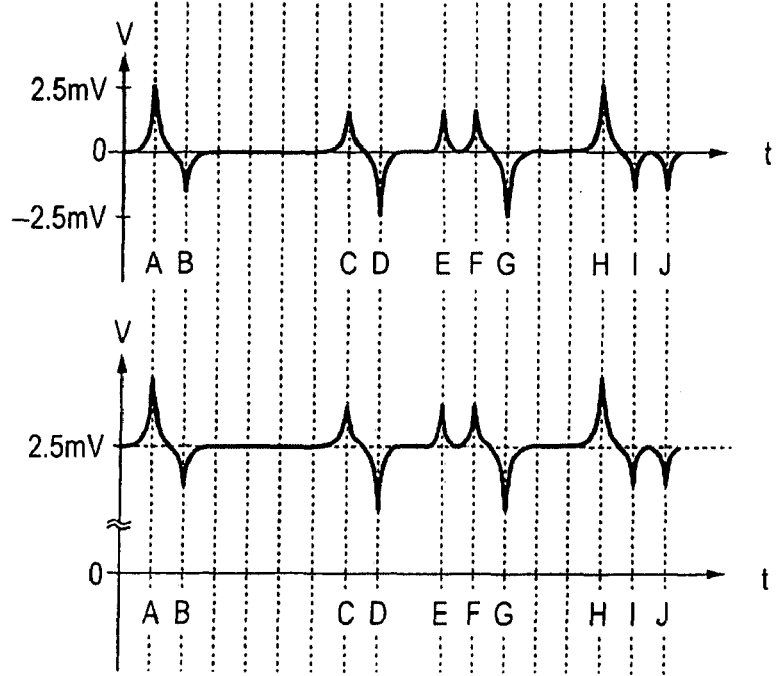

| MAGNETIC INK CHARACTER | REFERENCE VALUE STRING |
|---|---|
| STROKE 0 | (532, 521, · · ·) |
| STROKE 1 | · · · |
| STROKE 2 | · · · |
| STROKE 3 | · · · |
| STROKE 4 | · · · |
| STROKE 5 | · · · |
| STROKE 6 | · · · |
| STROKE 7 | · · · |
| STROKE 8 | · · · |
| STROKE 9 | · · · |
| STROKE 10 | · · · |
| STROKE 11 | · · · |
| STROKE 12 | · · · |
| STROKE 13 | · · · |

FIG. 12

| NUMBER OF TIMES (COUNT) | REFERENCE CHARACTER NUMBER |
|---|---|
| 1 | 5 |
| 2 | 8 |
| 3 | 12 |

FIG. 13

| NUMBER OF TIMES (COUNT) | REFERENCE ELEMENT NUMBER |
|---|---|
| 1 | D1 |
| 2 | D2 |
| 3 | D3 | ically, in the above-mentioned cases, the magnetic ink character reading apparatus uselessly performs the character recognition processing.

MAGNETIC INK CHARACTER READING APPARATUS

CROSS REFERENCE TO RELATED APPLICATION

This application claims priority from a Japanese Patent Application No. 2006-234990 filed on Aug. 31, 2006, the entire subject matter of which is incorporated herein by reference.

TECHNICAL FIELD

The present invention relates to a magnetic ink character reading apparatus and a method for controlling the apparatus.

BACKGROUND

Conventionally, there is known a magnetic ink character reading apparatus that is provided with a magnetic head for outputting a signal in accordance with a variation in a magnetic flux caused by a Magnetic Ink Character Recognition (MICR) characters. The magnetic ink character reading apparatus performs a character recognition processing based on a signal data string corresponding to the output signal of the magnetic head to recognize a magnetic ink character string recorded on a recording medium.

This type of magnetic ink character reading apparatus serves to read a character string of a predetermined format (a character number or the like) printed on a sheet with magnetic ink characters.

For example, for payment by check at a retail store, there is used a magnetic ink character reading apparatus which has a function to read a magnetic ink character string printed on a sheet and a function to print an image on a sheet. A salesperson in a retail store receives a check from a customer, and prints store identification information, purchase price, and the like, on the check by the magnetic ink character reading apparatus. Then, the customer confirms the store identification information, purchase price and the like printed on the check and signs his or her name on the check. And, the salesperson allows the magnetic ink character reading apparatus to read an account number and the like printed with magnetic ink characters on the surface of the check. Thus read account number and the like are transmitted to a host computer for confirming the validity of the account number. When the validity of the account number and the like are confirmed, the confirmation of the validity is printed on the check, which completes the payment by the check.

However, there happens a case where, although a character string of a predetermined format should be originally printed, a part of the character string is not printed due to some error made in the printing process.

For example, in a case where a 12-character character string as shown in FIG. 20 should be printed, there happens a case where one of the characters is missing, for example, as shown in FIG. 21. Also, even when all of the characters of a character string are printed, there happens a case where the character string is partially printed faint.

In these cases, the character string obtained as the result of recognition by the magnetic ink character reading apparatus does not provide a character string that conforms to a predetermined format, but some of the character string is missing. Here, in the magnetic ink character reading apparatus, the magnetic ink characters recorded on the recording medium are recognized one by one. Therefore, in the above-mentioned cases, whether or not the recognized character string conforms to the predetermined format is found only after completion of the character recognition processing. Accordingly, in the above-mentioned cases, the magnetic ink character reading apparatus uselessly performs the character recognition processing.

SUMMARY

According to a first aspect of the present invention, there is provided a magnetic ink character reading apparatus including: a magnetic head that reads a variation in magnetic flux caused by a magnetic ink character string recorded on a recording medium and outputs a signal in accordance with the read variation in magnetic flux; a character recognition section that recognizes the magnetic ink character string by performing a character recognition processing based on a signal data string included in the signal output from the magnetic head; a first determination section that reads out signal data sequentially from the signal data string and determines whether or not the read signal data conform with a predetermined signal; a second determination section that determines whether or not the first determination section determines that the read signal data does not conform with the predetermined signal over at least a predetermined number of signal data consecutively; a determination number counting section that counts a number of times the second determination section determines that the first determination section determines that the read signal data does not conform with the predetermined signal over at least the predetermined number of signal data consecutively; and a character recognition processing execution limit section that controls the character recognition section to limit performing the character recognition processing based on the number counted by the determination number counting section.

According to a second aspect of the present invention, there is provided a method for controlling a magnetic ink character reading apparatus including: a magnetic head that reads a variation in magnetic flux caused by a magnetic ink character string recorded on a recording medium and outputs a signal in accordance with the read variation in magnetic flux; and a character recognition section that recognizes the magnetic ink character string by performing a character recognition processing based on a signal data string included in the signal output from the magnetic head, wherein the method includes: a first determination step that reads out signal data sequentially from the signal data string and determines whether or not the read signal data conform with a predetermined signal; a second determination step that determines whether or not the first determination section determines that the read signal data does not conform with the predetermined signal over at least a predetermined number of signal data consecutively; a determination number counting step that counts a number of times the second determination section determines that the first determination section determines that the read signal data does not conform with the predetermined signal over at least the predetermined number of signal data consecutively; and a character recognition processing execution limit step that controls the character recognition section to limit performing the character recognition processing based on the number counted by the determination number counting section.

BRIEF DESCRIPTION OF THE DRAWINGS

In the accompanying drawings:

FIG. 2 is a view of the mechanism of a magnetic ink character reading section provided in the magnetic ink character reading apparatus shown in FIG. 1;

FIG. 3 is a view of an example of a magnetic ink character and a signal to be output when the magnetic ink character is read;

FIG. 11 is a view of an example of a reference value string table;

FIG. 12 is a view of an example of a reference character number table;

FIG. 13 is a view of an example of a reference element number table;

DETAILED DESCRIPTION

Description will be predetermined below in detail of an embodiment of a magnetic ink character reading apparatus according to the present invention.

Figure 1:
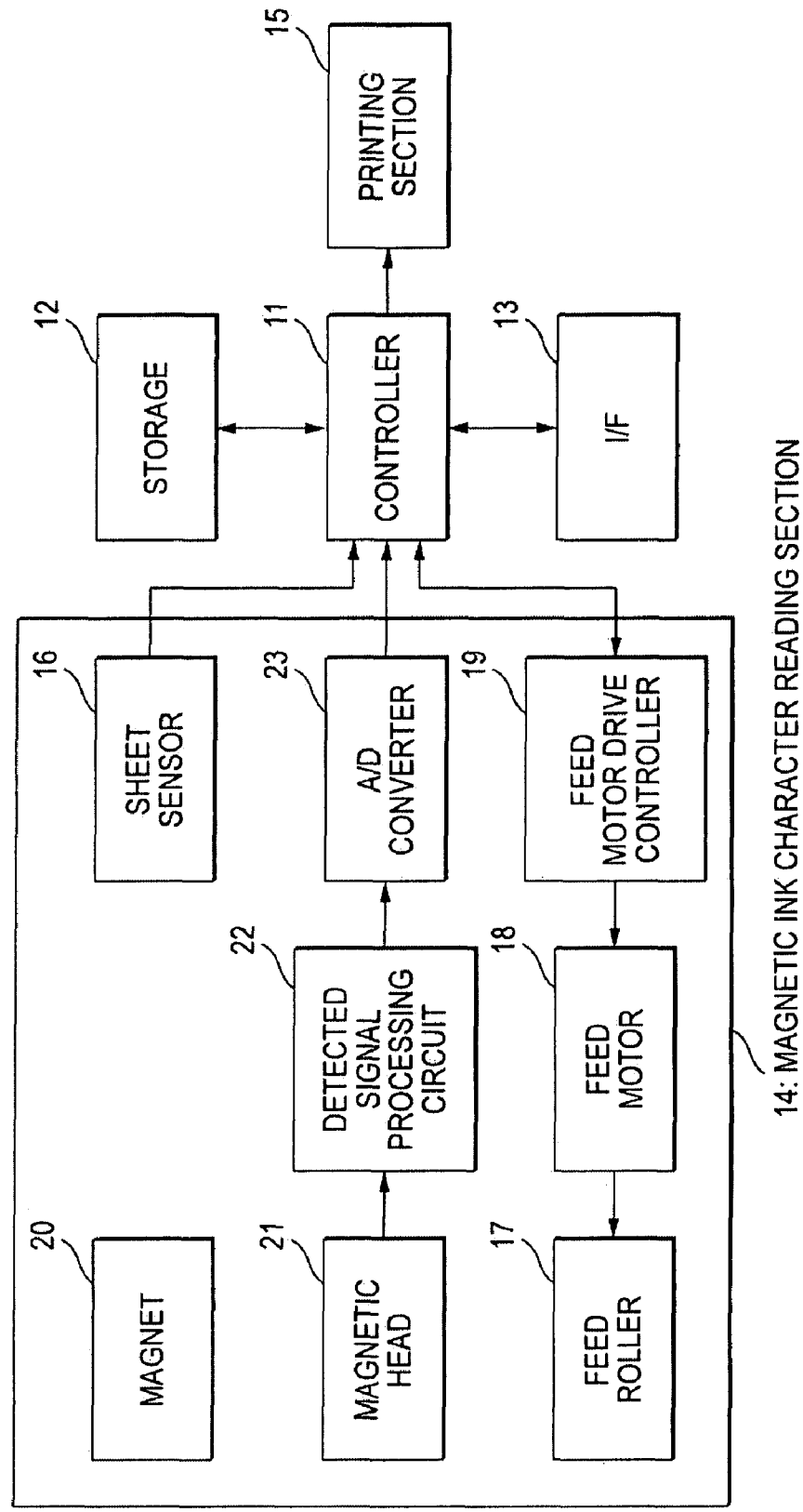
FIG. 1 is a block diagram of an overall structure of a magnetic ink character reading apparatus according to an embodiment of the present invention.

FIG. 1 is a block diagram of an overall structure of a magnetic ink character reading apparatus according to an embodiment of the present invention. As shown in FIG. 1, a magnetic ink character reading apparatus 10 according to the embodiment includes a controller 11, a storage 12, an interface (I/F) 13, a magnetic ink character reading section 14, and a printing section 15.

The controller 11 operates in accordance with instructions described in a program stored in the storage 12 to control the components provided in the magnetic ink character reading apparatus 10. The storage 12 includes computer readable information storage medium such as a ROM (Read Only Memory) and a RAM (Random Access Memory). The storage 12 also serves as a work memory for storing various data which are used to execute various processing.

The interface 13 serves to establish communication between the magnetic ink character reading apparatus 10 and a host computer (not shown) to transmits and receives data therebetween. The interface 13, according to an instruction from the controller 11, transmits various data to the host computer. For example, the various status information of the magnetic ink character reading apparatus 10 and the read results of magnetic ink characters printed (recorded) on a sheet (a recording medium) are supplied to the host computer through the interface 13. The interface 13 receives various data from the host computer and supplies them to the controller 11. For example, the print data of images generated according to various application programs in the host computer are supplied through the interface 13 to the controller 11.

The magnetic ink character reading section 14 serves to read magnetic ink characters printed on a sheet. The details of the operation of the magnetic ink character reading section 14 will be discussed later. The controller 11, based on data to be supplied from the magnetic ink character reading section 14, recognizes a character string printed on the sheet using magnetic ink characters. The character string, which is recognized by the controller 11, is supplied through the interface to the host computer and is then used in various processing.

The printing section 15 serves to print the images on the sheet. The controller 11 interprets print data supplied thereto through the interface 13 from the host computer and converts them into raster image data. The controller 11 supplies the raster image data to the printing section 15 for printing them.

As described above, the magnetic ink character reading apparatus 10 has a function to read the character row recorded on the sheet using the magnetic ink characters and a function to print the images on the sheet; and, the magnetic ink character reading apparatus 10 is used, for example, for payment by a check at a retail store.

Here, description will be predetermined in more detail of the magnetic ink character reading section 14. FIG. 2 is a typical view of the mechanism of the magnetic ink character reading section 14. As shown in FIGS. 1 and 2, the magnetic ink character part 14 includes a sheet sensor 16 (sheet sensors 16a and 16b), a feed roller 17, a feed motor 18, a feed motor drive controller 19, a magnet 20, a magnetic head 21, a detected signal processing circuit 22, and an A/D converter 23.

The sheet sensor 16a detects whether a sheet 24 is inserted into a predetermined insertion slot formed in the magnetic ink character reading apparatus 10 or not. The feed roller 17 feeds the sheet 24 inserted into the insertion slot at a predetermined speed. The feeding of the sheet 24 by the feed roller 17 realizes a relative movement between the magnetic head 21 and sheet 24. The feed motor 18 includes a step motor which serves to rotate the feed roller 17 at a predetermined speed. The feed motor drive controller 19 controls the driving of the feed motor 18. When the sheet sensor 16a detects that the sheet 24 is inserted into the insertion slot, the controller 11 allows the feed motor drive controller 19 to drive the feed motor 18. When the feed motor 18 is driven, the feed roller 17 is rotated in the A direction (clockwise) shown in FIG. 2 and thus the sheet 24 is fed in the B direction shown in FIG. 2. At the then time, the sheet 24 is held by and between the magnetic head 21 and feed roller 17.

The area of the surface 24a of the sheet 24, on which the magnetic ink characters are printed, can be magnetized by the magnet 20. The magnetic head 21 is an element which serves to detect a variation in magnetic flux. The magnetic head 21 outputs a signal (a detected signal) corresponding to the variation in the magnetic flux caused by the magnetic ink characters printed on the surface 24a of the sheet 24. The detected signal, which is output from the magnetic head 21, is input to the detected signal processing circuit 22.

Here, description will be predetermined of the detected signal to be output from the magnetic head 21 and the operation of the detected signal processing circuit 22. FIG. 3 is an explanatory view of the detected signal to be output from the magnetic head 21 and the operation of the detected signal processing circuit 22.

In the embodiment, the magnetic ink character reading apparatus 10 is assumed to read magnetic ink characters that are defined by the JIS X9002. The JIS X9002 defines fourteen kinds of magnetic ink characters (strokes 0~13). The strokes 0~9 correspond to numerals 0~9 respectively. The strokes 10~13 correspond to predetermined signs respectively. The section (a) in FIG. 3 shows an example of magnetic ink characters which are defined by the JIS X9002. Here, there are shown strokes 0 and 8. As shown in the section (a) in FIG. 3, each magnetic ink character is defined such that nine squares in the vertical direction and seven squares in the horizontal direction, each of which has a side of a length of 0.33 mm, can be stored in a rectangle. Also, the JIS X9002 defines that a pitch corresponding to one magnetic ink character is 3.175 mm.

The section (b) in FIG. 3 shows a detected signal which is output from the magnetic head 21 when the magnetic ink characters shown in FIG. 3A are read. As shown in the section (b) in FIG. 3, at timings (A, C, E, F, H) where at least a part of the detect target area of the magnetic head 21 turns from an area, in which the magnetic ink characters of the sheet 24 are not printed, to an area in which the magnetic ink characters are printed, that is, at timings where magnetic flux increases, a pulse of a positive polarity is output from the magnetic head 21. Also, at timings (B, D, G, I, J) where at least a part of the detect target area of the magnetic head 21 turns from an area, in which the magnetic ink characters of the sheet 24 are printed, to an area in which the magnetic ink characters are not printed, that is, at timings where magnetic flux decreases, a pulse of a negative polarity is output from the magnetic head 21.

Figures 4, 5:
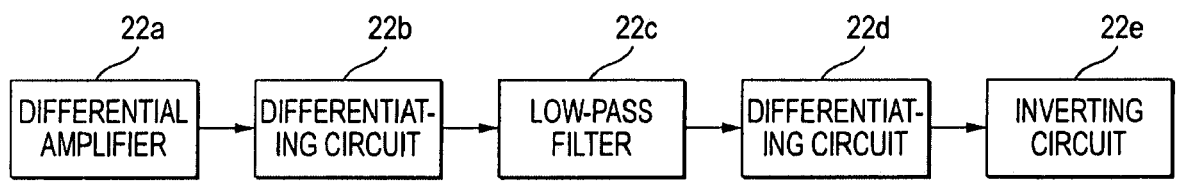
FIG. 4 is a functional block diagram of a detected signal processing circuit provided in the magnetic ink character reading apparatus shown in FIG. 1.
FIG. 5 is a view of an example of detected signal data.

The detected signal processing circuit 22 amplifies and filters a detected signal which is input therein from the magnetic head 21. FIG. 4 is a functional block diagram of the detected signal processing circuit 22. As shown in FIG. 4, the detected signal processing circuit 22 includes a differential amplifier 22a, a differentiating circuit 22b, a low-pass filter 22c, a differentiating circuit 22d and an inverting circuit 22e.

A detected signal input from the magnetic head 21 is DC biased (DC level shifted) by the differential amplifier 22a and is thereby amplified. According to the embodiment, the detected signal input from the magnetic head 21 is DC biased by the differential amplifier 22a by an amount equivalent to 2.5V. The detected signal amplified by the differential amplifier 22a is emphasized in the peak portion by the differentiating circuit 22b, while the noise component of the detected signal is removed by the low-pass filter 22c. The detected signal, the noise component of which is removed by the low-pass filter 22c, is input through the differentiating circuit 22d and inverting circuit 22e to the A/D converter 23.

The section (c) in FIG. 3 shows a signal which is output from the detected signal processing circuit 22 when the detected signal shown in the section (b) in FIG. 3 is input from the magnetic head 21. As shown in the section (c) in FIG. 3, a signal, which is obtained when the detected signal input from the magnetic head 21 is DC biased, is output from the detected signal processing circuit 22.

The A/D converter 23 A/D converts the signal input from the detected signal processing circuit 22 according to an interrupt signal which is generated by a timer circuit (not shown) When recognizing the magnetic ink character, it is important to specify the peak position of the detected signal accurately. For this reason, here, in order to be able to accurately specify the peak position of the detected signal in the recognition processing of the magnetic ink characters, the detected signal is sampled at a sampling frequency about ten times the minimum peak distance of the detected signal. Also, the detected signal is quantized at a quantizing bit number, for example, at 10 bits. More specifically, the detected signal is quantized in such a manner that a voltage of 0~5V is expressed by numeral values of 1024 steps. The A/D converted signals (which are hereinafter referred to as the detected signal data) are sequentially supplied to the controller 11 and are then sequentially stored into the storage 12. FIG. 5 shows an example of the detected signal data to be stored into the storage 12.

The above-described operation of the magnetic ink character reading section 14 will be repeated until the sheet 24 is not detected any longer by the sheet sensor 16b disposed on the downstream side of the magnetic head 21, or until the sheet 24 is fed by a predetermined quantity by the feed roller 17.

Next, description will be predetermined below of a processing for recognizing the magnetic ink characters printed on the sheet 24 according to the detected signal data stored in the storage 12. FIGS. 6 to 9 are respectively flow charts of this processing. FIG. 10 is an explanatory view of this processing. This processing can be realized when the controller 11 performs a program stored in the storage 12.

Figure 6:
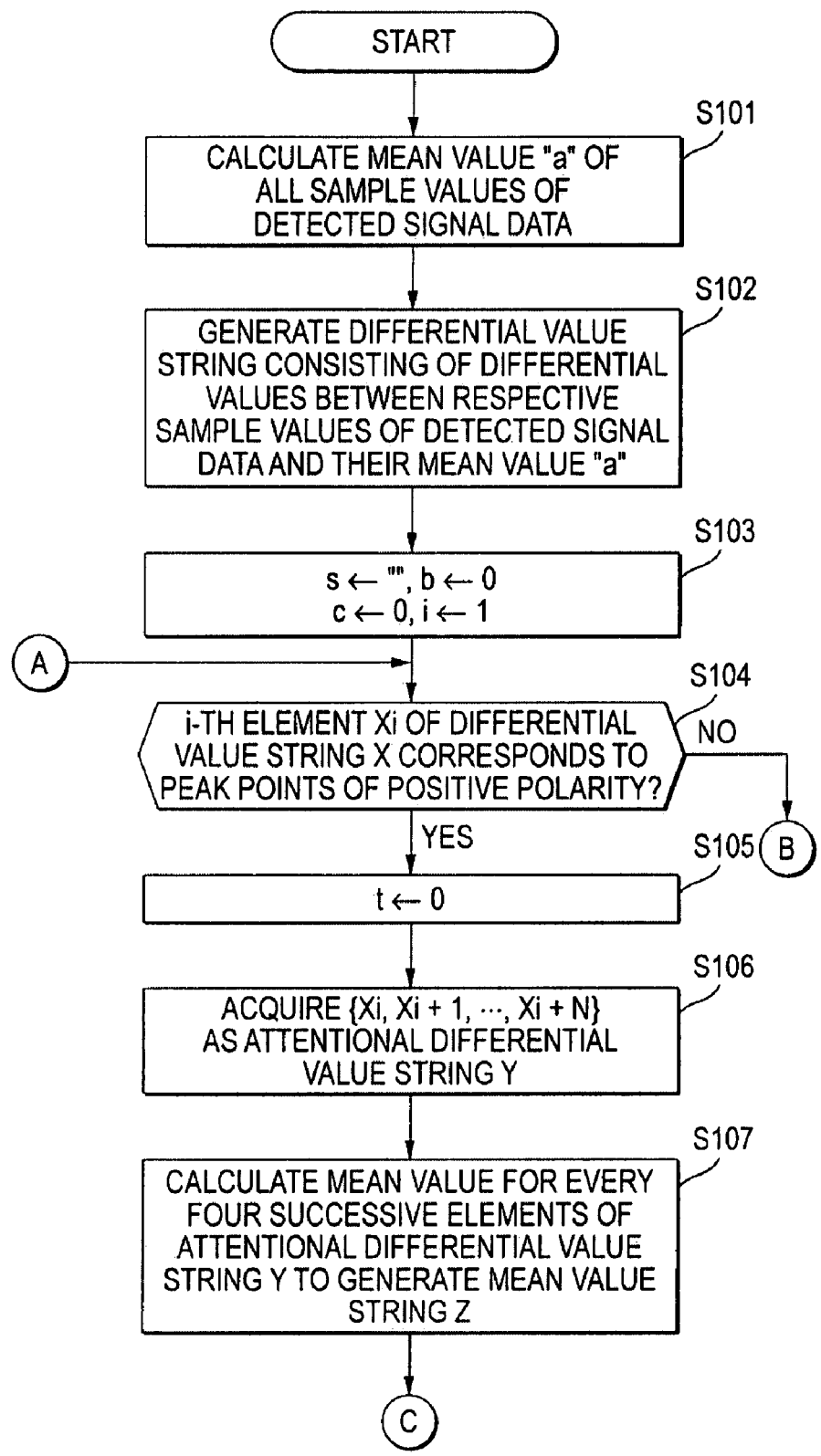
FIG. 6 is a flow chart of a processing to be performed by the magnetic ink character reading apparatus shown in FIG. 1.
Figure 7:
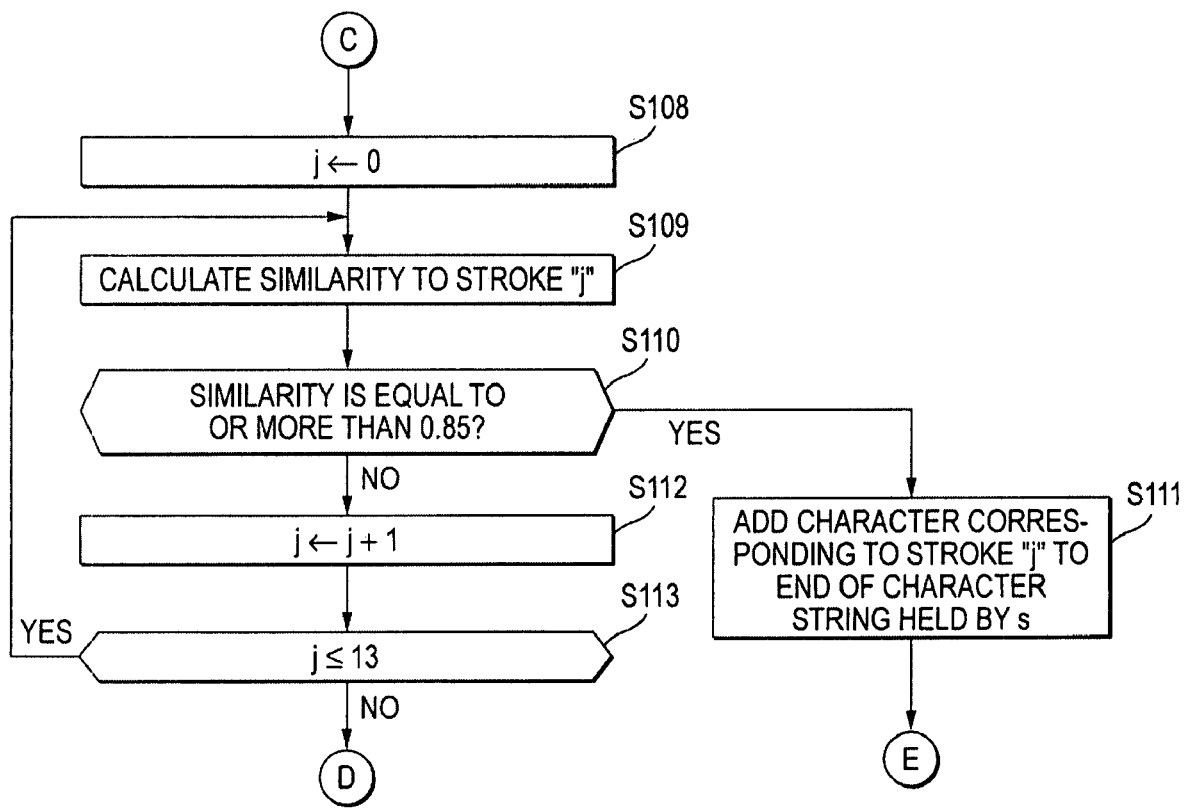
FIG. 7 is a flow chart of a processing to be performed by the magnetic ink character reading apparatus shown in FIG. 1.

As shown in FIG. 6, the magnetic ink character reading apparatus 10 calculates the mean value of all sample values of the detected signal data (S101). And, the magnetic ink character reading apparatus 10 generates a differential value string X which is the string of differential values between the respective sample values of the detected signal data and the mean value "a" thereof (S102: see (1) of FIG. 10).

Also, the magnetic ink character reading apparatus 10 initializes various variables (S103). For example, the magnetic ink character reading apparatus 10 initializes a character string type variable "s" to a null character string (a character string having a length of 0). This character string type variable "s" serves to hold the recognition result of a magnetic ink character string printed on the sheet 24. Also, for example, the magnetic ink character reading apparatus 10 initializes a variable "b" to 0. The variable "b" is a variable that is added one by one when it is detected that, in the differential value string X, a predetermined number of elements or more which do not correspond to the peak values of a positive polarity (the timings A, C, E, F, H and the like shown in FIG. 3B) are present consecutively That is, the variable "b" serves to count the number of times a predetermined number of elements or more not corresponding to the peak values of a positive polarity are detected to be present successively in the differential value string X. Also, for example, the magnetic ink character reading apparatus 10 initializes a variable "c" to 0. The variable "c" serves to count the number of magnetic ink characters which have been recognized. Also, for example, the magnetic ink character reading apparatus 10 initializes a variable "i" to 1.

After then, the magnetic ink character reading apparatus 10 determines whether an element $X_i$, which is the i-th element of the differential value string, corresponds to the peak points of a positive polarity or not (S104). For example, the magnetic ink character reading apparatus 10 determines whether the value of the element Xi is equal to or more than the value of an element $X_{i-1}$, which is a (i–1)-th element of the differential value string X, and is equal to or less than the value of an element $X_{i+1}$, which is the (i+1)-th element of the differential value string X, or not. And, when the value of the element $X_i$ is equal to or more than the value of the element $X_{i-1}$, and is equal to or less than the value of the element $X_{i+1}$, the magnetic ink character reading apparatus 10 determines that the element $X_i$ corresponds to the peak points of a positive polarity.

When the element $X_i$ corresponds to the peak points of a positive polarity, the magnetic ink character reading apparatus 10 initializes the value of a variable "t" to 0 (S105). The variable "t" serves to count the number of successive elements which do not correspond to the peak points of a positive polarity.

After then, the magnetic ink character reading apparatus 10 executes a processing for recognizing the magnetic ink character string printed on the sheet 24.

Firstly, the magnetic ink character reading apparatus 10 obtains the elements $X_i, X_{i+1}, X_{i+2}, \ldots, X_{i+N}$ of the differential value string X as an attentional differential value string Y (S106: see (2) of FIG. 10). This attentional differential value string Y is a differential value string which corresponds to one character. The value of the constant N is set for the number of elements (the number of samples) that corresponds to one character. That is, the constant N is set for the number of elements corresponding to the time required to feed the sheet 24 by a distance equivalent to the pitch of the magnetic ink characters. The time required to feed the sheet 24 by a distance equivalent to the pitch of the magnetic ink characters can be calculated based on the pitch of the magnetic ink characters and the feed speed of the sheet 24. Also, the number of elements corresponding to this time can be calculated based on this time and the sampling frequency.

After then, the magnetic ink character reading apparatus 10 calculates a mean value every four consecutive elements in relation to the attentional differential value string Y to generate a mean value string Z (S107: see (3) of FIG. 10).

And, the magnetic ink character reading apparatus 10, based on the mean value string Z, specifies a magnetic ink character corresponding to the attentional differential value string Y.

Firstly, the magnetic ink character reading apparatus 10 initializes a variable "j" to 0 (S108). And, the magnetic ink character reading apparatus 10 calculates a similarity to a stroke "j" (S109).

In the storage 12, for example, there is previously stored such a reference value string table as shown in FIG. 11. As shown in FIG. 11, the reference value string table is a table which shows a reference value string P for every magnetic ink character. Here, the "reference value string" is reference detected signal data that, after a similar processing (DC biasing or the like) to the processing to be performed on the original detected signals of the respective magnetic ink characters (on the detected signals that are output from the magnetic head 21 when the respective magnetic ink characters are read) by the detected signal processing circuit 22 is performed, are obtained by executing a similar A/D conversion processing to the processing to be performed by the A/D converter 23.

In S109, the magnetic ink character reading apparatus 10 reads the reference value string P of the stroke "j". Next, the magnetic ink character reading apparatus 10 executes processing similar to those in S101 and S102 on the reference value string P of the stroke "j" to thereby generate the reference differential value string Q of the stroke "j" (see (4) of FIG. 10). After then, the magnetic ink character reading apparatus 10 performs, a processing similar to the processing in S107 on the reference differential value string Q of the stroke "j" to thereby generate a reference means value string R (see (5) of FIG. 10). And, the magnetic ink character reading apparatus 10 calculates a similarity between the mean value string Z and reference mean value string R (see (6) of FIG. 10). This similarity can be calculated according to the following expression (1). The similarity provides a value in the range of –1 or more to 1 or less; and, the larger the value of the similarity is, the higher the similarity between the mean value string Z and reference mean value string R is.

$$similarity = \frac{\sum_{i=1}^{m}(Zi \times Ri)}{\sqrt{\sum_{i=1}^{m} Zi^2} \times \sqrt{\sum_{i=1}^{m} Ri^2}} \quad (1)$$

The similarity calculated in S109 is stored into the storage 12 as the similarity to the stroke "j".

Next, the magnetic ink character reading apparatus 10 determines whether the similarity calculated in S109 is equal to or more than 0.85 or not (S110). When the similarity is equal to or more than 0.85, the magnetic ink character reading apparatus 10 determines that the attentional differential value string Y shows the magnetic detect result of the stroke "j". In this case, the magnetic ink character reading apparatus 10 adds a character corresponding to the stroke "j" to the end of a character string held by a character string type variable "s" (S111). For example, when the value of the variable "j" is 0, a character corresponding to the stroke 0, that is, "0" is added to the end of the character string held by the character string type variable "s". Also, for example, when the value of the variable "j" is 10, a character corresponding to a stroke 10, for example, "A" is added to the end of a character string held by the character string type variable "s".

In this manner, in the process where the similarities of the respective strokes 0~13 are calculated sequentially, when the similarity of a certain magnetic ink character is extremely high, the magnetic ink character reading apparatus 10 determines that the attentional differential value string Y shows the magnetic detect result of the present magnetic ink character, while the magnetic ink character reading apparatus 10 does not calculate the similarities of the remaining magnetic ink characters (the magnetic ink characters that have not been calculated at the then time). This makes it possible for the magnetic ink character reading apparatus 10 to reduce its processing load.

On the other hand, when the similarity is less than 0.85, the magnetic ink character reading apparatus 10 adds 1 to the value of the variable "j" (S112) and determines whether the value of the variable "j" is equal to or less than 13 or not (S113). When the value of the variable "j" is 13 or less, the magnetic ink character reading apparatus 10 executes the processing in and from S109 again. In this manner, the similarities of the respective strokes 0~13 are calculated and are stored into the storage 12.

In S113, when the value of the variable "j" is determined larger than 13, that is, when all of the similarities of the strokes 0~13 are calculated, the magnetic ink character reading apparatus 10 determines whether the largest value of the similarities of the strokes 0~13 is equal to 0.5 or more or not (S114).

When the largest value of the similarities of the strokes 0~13 is less than 0.5, the magnetic ink character reading apparatus 10 executes a read error processing (S115), thereby stopping the present processing. In this case, there is performed, for example, a processing or outputting a message telling the occurrence of a read error to the liquid crystal display of the magnetic ink character reading apparatus 10, or a processing for transmitting a predetermined data to the host computer to thereby output a message telling of the occurrence of a read error to the display part of the host computer.

When the largest value of the similarities of the strokes 0~13 is a low value, there is a possibility that the attentional differential value string Y does not show the magnetic detect result of the magnetic ink character having the highest similarity. In this case, when determined that the attentional differential value string Y shows the magnetic detect result of the magnetic ink character having the highest similarity, there is a possibility that the magnetic detect result can be recognized erroneously. In view of this, in the magnetic ink character reading apparatus 10, since the processing in S114 and S115 are performed, the occurrence of such wrong recognition can be prevented.

On the other hand, when the largest value of the similarities of the strokes 0~13 is 0.5 or more, the magnetic ink character reading apparatus 10 determines whether the largest value of the similarities of the strokes 0~13 is equal to or more than 0.6 or not (S116). And, when the largest value of the similarities of the strokes 0~13 is less than 0.6, the magnetic ink character reading apparatus 10 performs a read error processing (S117). In this case, there is performed a processing for executing the reading of the magnetic ink characters again (a retry processing) For example, the magnetic ink character reading apparatus 10 rotates the feed roller 17 reversely to return the sheet 24 to the initial position (insertion slot). After then, the magnetic ink character reading apparatus 10 rotates the feed roller 17 forwardly to thereby acquire the detected signal data (see FIG. 5). On acquiring the detected signal data again, the magnetic ink character reading apparatus 10 executes the present processing from the beginning based on the thus acquired detected signal data.

When the largest value of the similarities of the strokes 0~13 is not a low value nor it can be said to be a high value, there may be a possibility that a variation in the magnetic flux due to the magnetic ink characters printed on the sheet 24 has not been detected properly according to a temporary factor. In view of this, in the case of the magnetic ink character reading apparatus 10, in such a case, after it automatically acquires the detected signal data again, it executes the present processing again from the beginning based on the thus reacquired detected signal data. In this manner, since the magnetic ink character reading apparatus 10 performs the processing in S116 and S117, the recognition accuracy of the magnetic ink character reading apparatus 10 is enhanced. Also, the magnetic ink character reading apparatus 10, when carrying out again the reading of the magnetic ink characters, can prevent the time and labor of a user from increasing.

On the other hand, when the largest value of the similarities of the strokes 0~13 is 0.6 or more, the magnetic ink character reading apparatus 10 determines whether a difference between the largest value of the similarities of the strokes 0~13 and the second largest value thereof is equal to or more than 0.3 or not (S118). And, when the difference between the largest value of the similarities of the strokes 0~13 and the second largest value is less than 0.3, the magnetic ink character reading apparatus 10 performs a read error processing (S117). That is, in this case as well, after the automatic execution of re-acquisition of the detected signal data, the present processing is performed again from the beginning based on the thus reacquired detected signal data.

When the difference between the largest value of the similarities of the strokes 0~13 and the second largest value is small, there may also be a possibility that the attentional differential value string Y does not show the magnetic detect result of the magnetic ink character having the highest similarity but shows the magnetic detect result of the magnetic ink character having the second highest similarity. In this case as well, when determined that the attentional differential value string Y shows the magnetic detect result of the magnetic ink character having the highest similarity, there is a reasonable possibility that the magnetic detect result can be recognized erroneously. In view of this, in the magnetic ink character reading apparatus 10, the processing in S118 and S117 are performed to thereby be able to prevent the occurrence of such wrong recognition.

On the other hand, when a difference between the largest value of the similarities of the strokes 0~13 and the second largest value thereof is 0.3 or more, the magnetic ink character reading apparatus 10 determines that the attentional differential value string Y shows the magnetic detect result of the magnetic ink character having the highest similarity among the strokes 0~13, and thus adds a character corresponding to the present magnetic ink character to the end of a character string held by the character string type variable "s" (S119). For example, when the similarity of the stroke 0 is highest, a character corresponding to the stroke 0, that is, "0" is added to the end of the character string held by the character string type variable "s".

In S111 or S119, when a magnetic ink character corresponding to the attentional differential value string Y is specified and a character corresponding to the magnetic ink character is added to the end of the character string held by the character string type variable "s", the magnetic ink character reading apparatus 10 adds 1 to the value of the variable "c" (S120). After then, the magnetic ink character reading apparatus 10 determines whether the element $X_{i+N}$ is the last element of the differential value string X or not (S121). When the element $X_{i+N}$ is the last element of the differential value string X, the magnetic ink character reading apparatus 10 ends the present processing. On the other hand, when the element $X_{i+N}$ is not the last element of the differential value string X, the magnetic ink character reading apparatus 10 adds N+1 to the value of the variable "i" (S122), and returns the processing to S104.

Next, description will be predetermined below of a case in which, in S104, it is determined that the element $X_i$ does not correspond to the peak points of a positive polarity.

When determined that the element $X_i$ does not correspond to the peak points of a positive polarity, the magnetic ink character reading apparatus 10 adds 1 to the value of the variable "t" (S123). And, the magnetic ink character reading apparatus 10 determines whether the value of the variable "c" is larger than 0 and the value of the variable "t" has become a constant T or not (S124). The constant T is set for the number of elements (the number of samples) that corresponds, for example, to one character. That is, the constant T is set for, example, the number of elements corresponding to the time necessary to feed the sheet 24 by a distance corresponding to the pitch of the magnetic ink characters. In this case, the time necessary to feed the sheet 24 by the distance corresponding to the pitch of the magnetic ink characters can be calculated based on the pitch of the magnetic ink characters and the feed speed of the sheet 24. Also, the number of elements corresponding to the present time can be calculated based on the present time and sampling frequency. When the constant T is set in this manner, in S124, it is determined whether a state, in which an increase in the magnetic flux is not detected, has continued for a period equal to or more than the time necessary for feeding the sheet 24 by the distance corresponding to the pitch of the magnetic ink characters or not. Further, in other words, there is detected the existence of a space that corresponds to one magnetic ink character or more. Here, while ignoring a space extending from the end of the sheet 24 to the first magnetic ink character, it is determined in S124 whether the value of the variable "c" is larger than 0 or not.

When the value of the variable "c" is larger than 0 and the value of the variable "t" is equal to T, the magnetic ink character reading apparatus 10 adds 1 to the value of the variable "b" (S125). After then, the magnetic ink character reading apparatus 10 reads a reference character number C corresponding to the value of the variable "b" from a reference character number table (S126).

Figure 20:
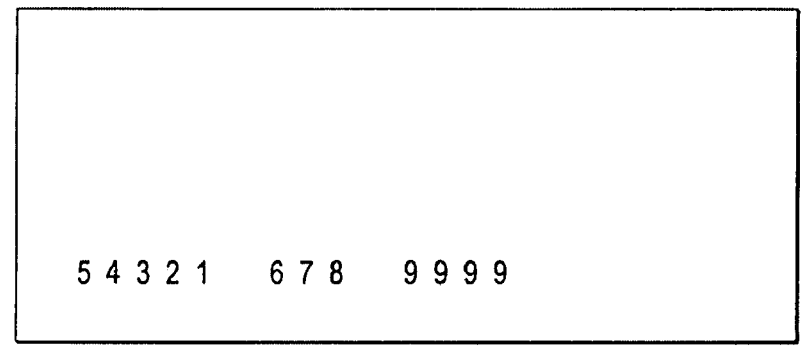
FIG. 20 is a view of an example of a sheet on which a character string is printed using magnetic ink characters.

Here, description will be predetermined below of the reference character number table. FIG. 12 shows an example of the reference character number table. As shown in FIG. 12, the reference character number table is a table which includes a "the number of times (count)" field and a "reference character number" field, and also in which the number of times the successive existence of a predetermined number of elements or more not corresponding to the peak points of a positive polarity in the differential value string X is detected is made to correspond to the number of characters (the reference character number) that are to have been recognized at the then time. This reference character number table is set to the format of the magnetic ink character string printed on the sheet 24. FIG. 12 shows a reference character number table which serves to read the magnetic ink character string of a format shown in FIG. 20. That is, FIG. 12 shows a reference character number table used to read a magnetic ink character string which includes twelve magnetic ink characters and a space corresponding to one or more magnetic ink characters is inserted between the fifth and sixth magnetic ink characters and also between the eighth and ninth magnetic ink characters. Specifically, the reference character number table shown in FIG. 12 expresses that, in the first detection of the successive existence of a predetermined number or more is elements not corresponding to the peak points of a positive polarity in the differential value string X, five characters (in the example shown in FIG. 20, five characters; 5, 4, 3, 2, and 1) must have been recognized. Also, the reference character number table shown in FIG. 12 expresses that, in the second detection, eight characters (in the example shown in FIG. 20, eight characters; 5, 4, 3, 2, 1, 6, 7 and 8) must have been recognized. Further, the reference character number tables shown in FIG. 12 expresses that, in the third detection, twelve characters (in the example shown in FIG. 20, twelve characters; 5, 4, 3, 2, 1, 6, 7, 8, 9, 9, 9, and 9) must have been recognized. As described above, here, the space from the end of the sheet 24 to the first magnetic ink character is ignored.

In S126, the magnetic ink character reading apparatus 10 reads, as a reference character number C, the value of the reference character number field in a record in which the value of the number of times field is equal to the value of the variable "b".

After then, the magnetic ink character reading apparatus 10 determines whether the value of the variable "c" is equal to the reference character number C or not (S127). When the value of the variable "c" is not equal to the reference character number C, the magnetic ink character reading apparatus 10 executes a read error processing (S128), thereby stopping the present character recognition processing. The read error processing in this case is similar to the read error processing to be performed in S115.

Figure 21:
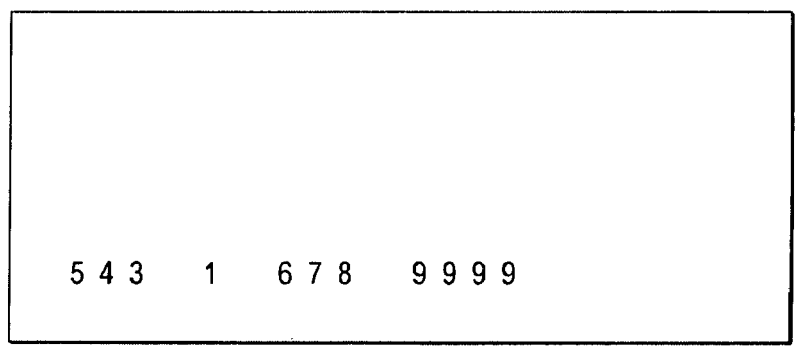
FIG. 21 is a view of another example of a sheet on which a character string is printed using magnetic ink characters.

As described above, in the magnetic ink character reading apparatus 10, each time the successive existence of a predetermined number of elements or more not corresponding to the peak points of a positive polarity in the differential value string X is detected, it is determined whether the number of characters recognized up to the then time is right according to the format of the magnetic ink character string printed on the sheet 24 or not. And, when the number of characters recognized is right, the character recognition processing is continued; but, when the number of characters recognized is not right, the character recognition processing is stopped. Thanks to this, in the magnetic ink character reading apparatus 10, for example, as shown in FIG. 21, when the magnetic ink character string is not in part printed, or when it is printed faint, it can be gathered at a relatively early stage that the recognition result does not conform to a predetermined format, thereby being able to prevent the character recognition processing from being performed uselessly.

Alternatively, instead of the reference character number table, for example, such a reference element number table as shown in FIG. 13 may be stored. As shown in FIG. 13, the reference element number table is a table which includes a "the number of times (count)" field and a "reference element number" field and also in which the number of times the succession existence of a predetermined number of elements or more not corresponding to the peak points of a positive polarity in the differential value string X is detected is made to correspond to the number of elements (the reference element number) that must have been processed up to the then time. The reference element number table as well, similarly to the reference character number table, is set to the format of the magnetic ink character string printed on the sheet 24. In this case, the magnetic ink character reading apparatus 10, in S126 shown in FIG. 9, may read a reference element number D corresponding to the value of the variable "b" from the reference element number table. Also, since the value of the variable "i" expresses the number of element processed, the magnetic ink character reading apparatus 10, in S127 shown in FIG. 9, may check whether the value of the variable "i" is equal to the reference element number D or not. In this manner, it may be gathered in a relatively early stage that the recognition result does not conform to a predetermined format, which makes it possible to prevent the character recognition processing from being performed uselessly.

When the value of the variable "c" is 0 (in S124, NO), when the value of the variable "t" is not T (in S124, NO), or when the value of the variable "c" is equal to the reference character number C (in S127, YES), the magnetic ink character reading apparatus 10 determines whether the element Xi is the last element of the differential value string X or not (S129). When the element $X_i$ is the last element of the differential value string X, the magnetic ink character reading apparatus 10 ends the present character recognition processing. On the other hand, when the element Xi is not the last element of the differential value string X, the magnetic ink character reading apparatus 10 adds 1 to the value of the variable "i" (S130) and performs again the processing in and from S104.

Figure 14:
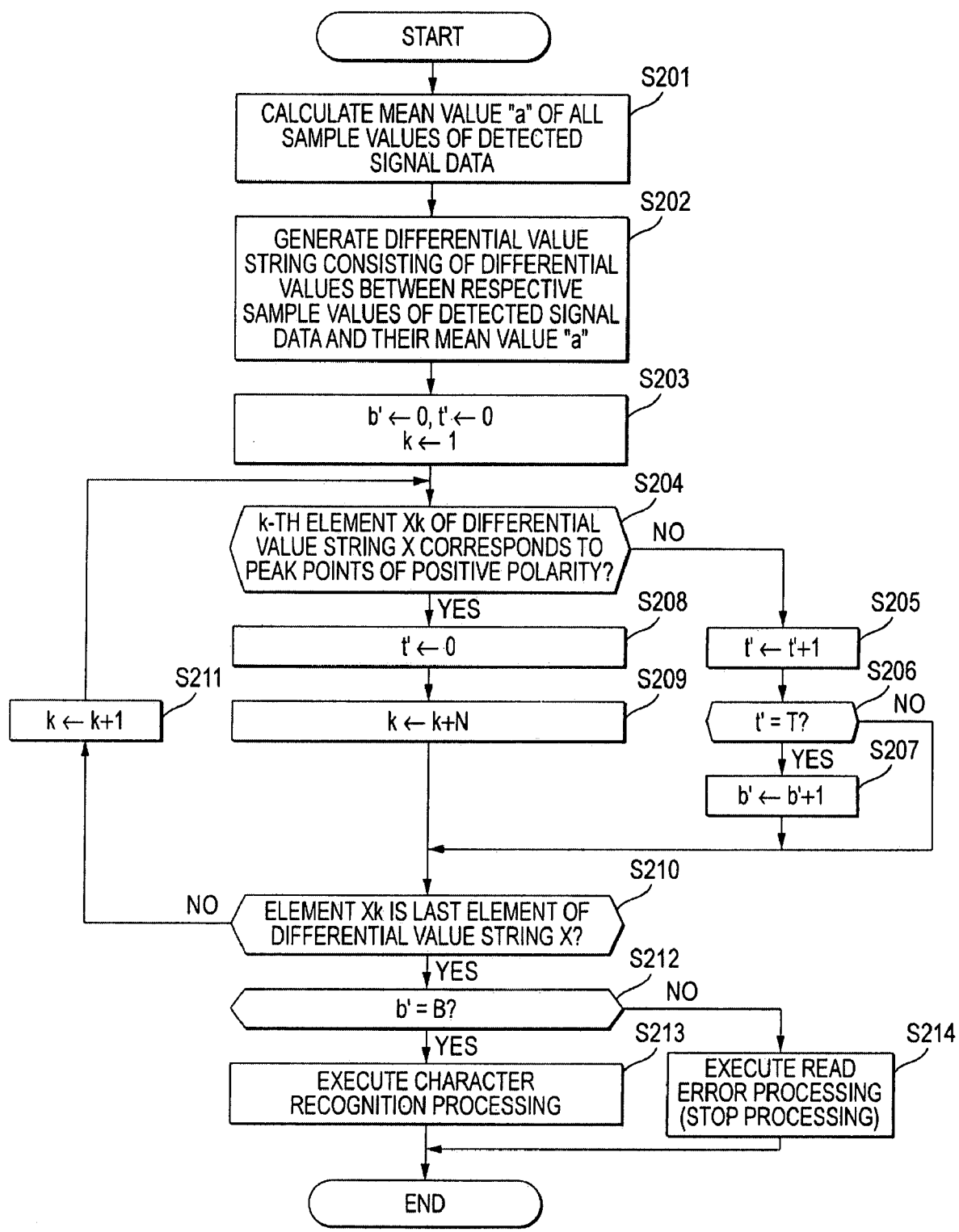
FIG. 14 is a flow chart of a processing to be performed by the magnetic ink character reading apparatus shown in FIG. 1.

Alternatively, after determining whether, when the magnetic ink character string is not in part printed or when it is printed faint, the magnetic ink character string as the result of recognition does not conform to a predetermined format or not, the magnetic ink character reading apparatus 10 may start the execution of the character recognition processing. FIG. 14 is a flow chart of the processing to be performed in this case.

In this case, as shown in FIG. 14, the magnetic ink character reading apparatus 10 calculates the mean value "a" of all sample values of the detected signal data (see FIG. 5) (S201). And, the magnetic ink character reading apparatus 10 generates the differential value string X which is a string of differential values between the sample values of the detected signal data and means value "a" (S202). These processing are performed similarly to the processing to be performed in S101 and S102 shown in FIG. 6.

Also, the magnetic ink character reading apparatus 10 initializes various variables (S203). For example, the magnetic ink character reading apparatus 10 initializes a variable "b'" and a variable "t'" to 0 respectively. The variable "b'" is similar to the variable "b" shown in FIGS. 6 to 9. And, the variable "t'" is similar to the variable "t" shown in FIGS. 6 to 9. Also, for example, the magnetic ink character reading apparatus 10 initializes a variable "k" to 1.

After then, the magnetic ink character reading apparatus 10 determines whether the k-th element $X_k$ of the differential value string X corresponds to the peak points of a positive polarity or not (S204). This check is performed similarly to the determination in S104 shown in FIG. 6.

When the element $X_k$ does not correspond to the peak points of a positive polarity, the magnetic ink character reading apparatus 10 adds 1 to the value of the variable "t'" (S205). And, the magnetic ink character reading apparatus 10 determines whether the value of the variable "t'" has become a constant T or not (S206). The constant T is similar to the constant T in S124 shown in FIG. 9. When the value of the variable "t'" has become the constant T, the magnetic ink character reading apparatus 10 adds 1 to the value of the variable "b'" (S207).

On the other hand, when the element $X_k$ corresponds to the peak points of a positive polarity, the magnetic ink character reading apparatus 10 initializes the value of the variable "t'" to 0 (S208). Also, the magnetic ink character reading apparatus 10 adds a constant N to the value of variable "k" (S209). Here, the constant N is similar to the constant N in S106 shown in FIG. 6. In this case, the elements of the differential value string X ranging from the element $X_k$ to the element $X_{k+N}$ are read but disregarded.

When the processing in S204 to S209 are completed, the magnetic ink character reading apparatus 10 determines whether the element $X_k$ is the last element of the differential value string X or not (S210). When the element $X_k$ is not the last element of the differential value string X, the magnetic ink character reading apparatus 10 adds 1 to the value of the variable "k" (S211) and performs again the processing in and from S204.

On the other hand, when the element $X_k$ is the last element of the differential value string X, the magnetic ink character reading apparatus 10 determines whether the value of the variable "b'" is equal to a constant 8 or not (S212). The constant B is set to the format of the magnetic ink character string printed on the sheet 24 and is stored into the storage 12. For example, when reading the magnetic ink character string of a format shown in FIG. 20, the constant B is set for 4. The reason for this is as follows. That is, when reading the character string of the format shown in FIG. 20, the successive existence of a predetermined number of elements or more not corresponding to the peak points of a positive polarity in the differential value string X is to be detected four times because there are present four spaces: specifically, a) a space existing from the left end of the sheet 24 to the first character, namely, the magnetic ink character "5"; b) a space intervening between the fifth and sixth magnetic ink characters "1" and "6"; c) a space intervening between the eighth and ninth magnetic ink characters "8" and "9"; and, d) a space existing from the twelfth magnetic ink character "9" to the left end of the sheet 24. Here, spaces existing from the left end of the sheet 24 to the first magnetic ink character are taken into consideration.

When the value of the variable "b'" is equal to the constant B, the magnetic ink character reading apparatus 10 executes the recognition processing of the magnetic ink characters (S213). Here, the recognition processing of the magnetic ink characters is similar to the processing shown in FIGS. 6 to 9. However, S101 and S102 shown in FIG. 6 and S123 to S128 shown in FIG. 9 may also be omitted.

On the other hand, when the value of the variable "b'" is not equal to the constant B, the magnetic ink character reading apparatus 10 performs a read error processing (S214) and stops the present recognition processing. The read error processing in this case is similar to the read error processing in S115 shown in FIG. 8.

According to this configuration as well, for example, when the magnetic ink character string is not in part printed, or when it is printed faint, it can be gathered at a relatively early stage that the character recognition result does not conform to a predetermined format, which makes it possible to prevent the character recognition processing from being performed uselessly.

Figure 8:
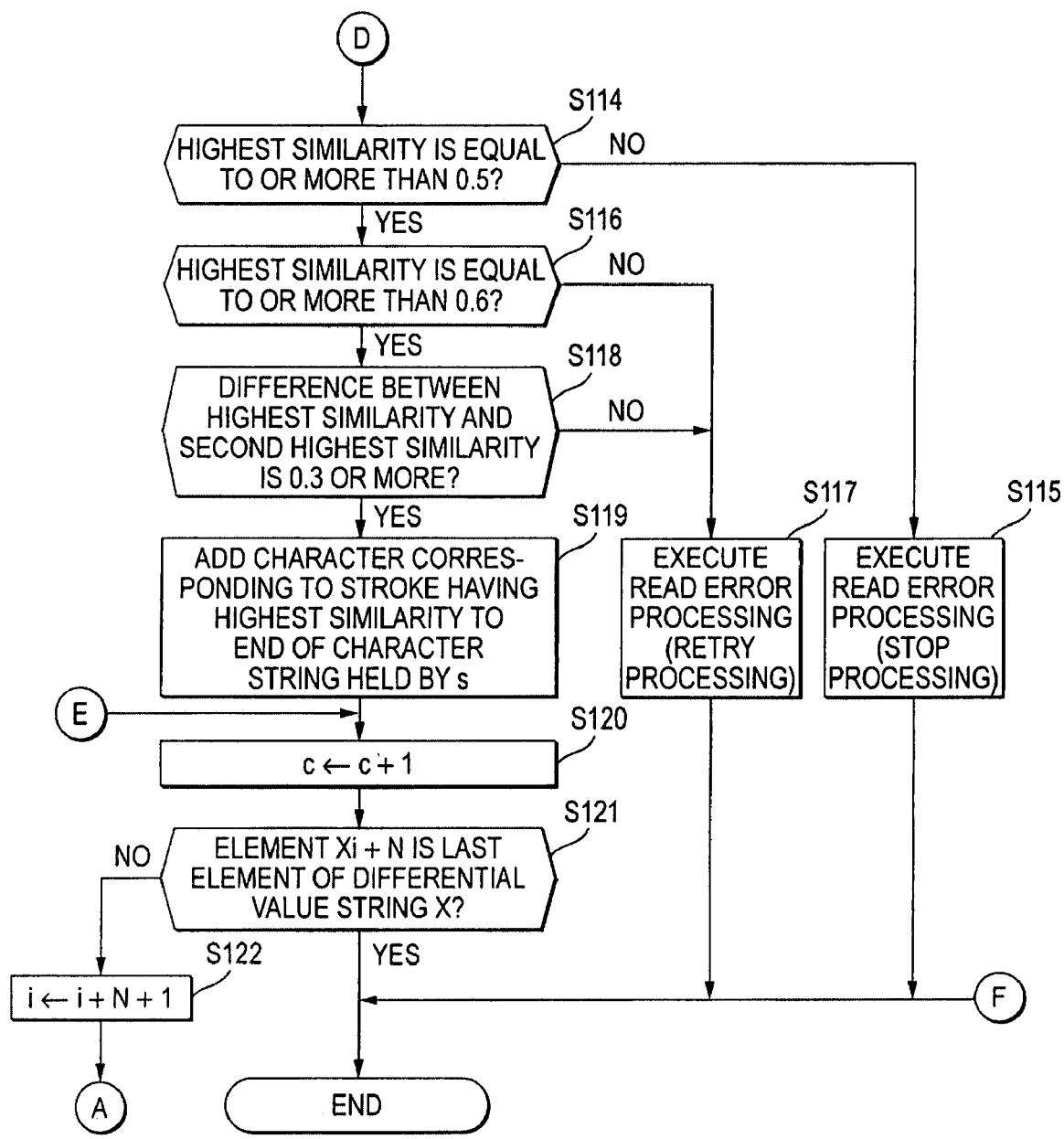
FIG. 8 is a flow chart of a processing to be performed by the magnetic ink character reading apparatus shown in FIG. 1.
Figure 15:
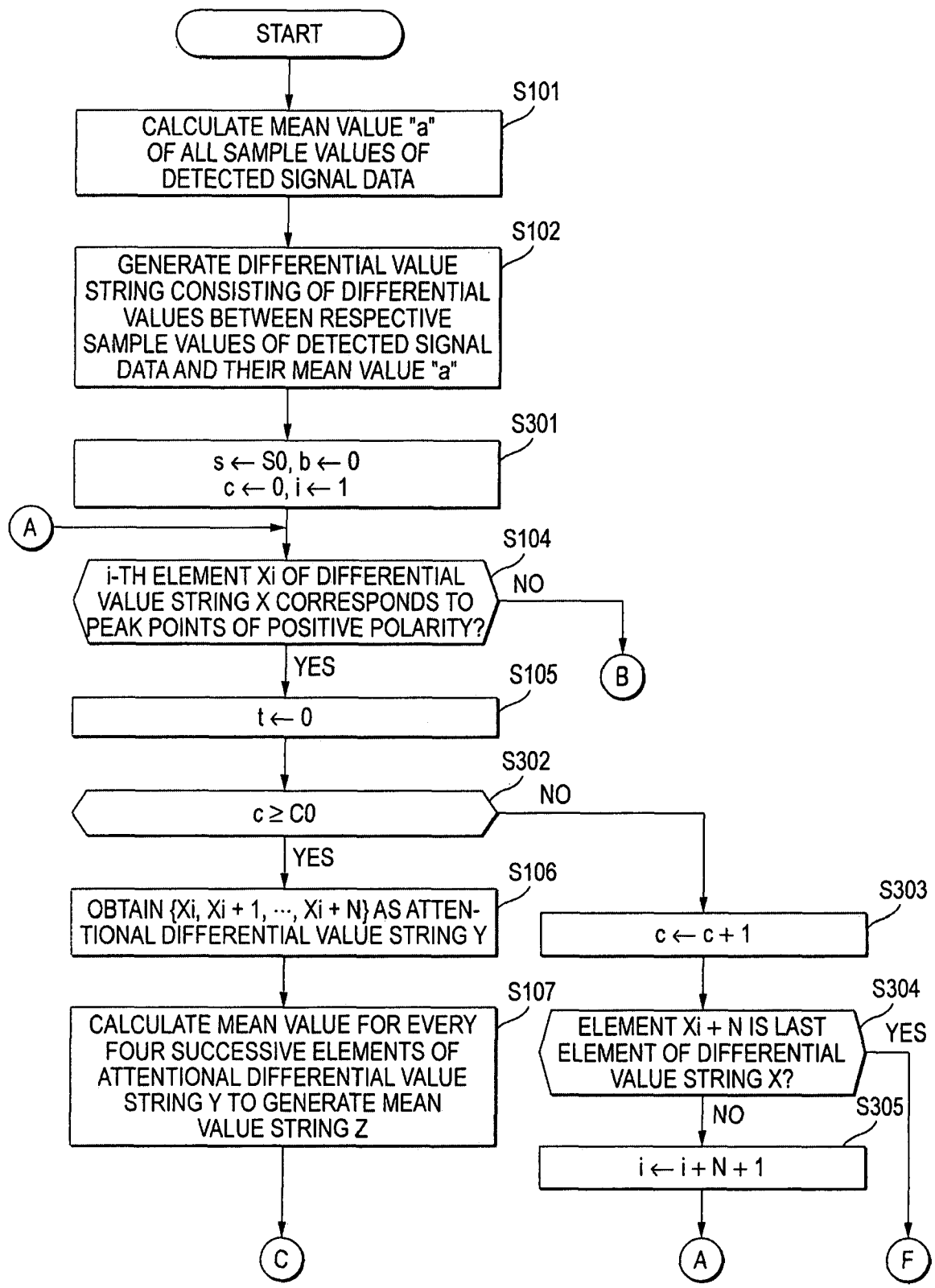
FIG. 15 is a flow chart of a processing to be performed by the magnetic ink character reading apparatus shown in FIG. 1.

Also, when the processing in S117 shown in FIG. 8 is performed and the recognition of the magnetic ink characters is performed according to the reacquired detected signal data, the load of the processing may also be reduced in the following manner. That is, in the read error processing in S117 shown in FIG. 8, the then time value of the variable "c" may be stored into the storage 12 as a recognized character number C0 and also a character string held at the then time by the character string type variable "s" maybe stored into the storage 12 as a recognized character string S0. And, the magnetic ink character reading apparatus 10, when executing again the recognition of the magnetic ink characters according to the reacquired detected signal data, may also carry out processing shown in FIG. 15, instead of the processing shown in FIG. 6. In FIG. 15, processing similar to those shown in FIG. 6 are predetermined the same symbols.

The processing shown in FIG. 15 are different from the processing shown in FIG. 6 in that, instead of the processing in S103, a processing in S301 is performed. S301 is different from S103 in that the character string type variable "s" is initialized to the recognized character string S0 to be stored into the storage 12.

Also, the processing shown in FIG. 15 are different from the processing shown in FIG. 6 in that S302 is added between S105 and S106 and also in that S303 to S305 are added. That is, in the processing shown in FIG. 15, when the element Xi corresponds to the peak points of a positive polarity, the magnetic ink character reading apparatus 10 reads the recognized character number C0 stored in the storage 12 and determines whether the value of the variable "c" is equal to or more than the recognized character number C0 or not (S302). When the value of the variable "C" is less than the recognized character number C0, the magnetic ink character reading apparatus 10 adds 1 to the value of the variable "c" (S303). And, the magnetic ink character reading apparatus 10 determines whether the element $X_{i+N}$ is the last element of the differential value string X or not (S304). When the element $X_{i+N}$ is the last element of the differential value string X, the magnetic ink character reading apparatus 10 ends the present character recognition processing. On the other hand, when the element $X_{i+N}$ is not the last element of the differential value string X, the magnetic ink character reading apparatus 10 adds N+1 to the value of the variable "i" (S305) and, after then, executes again the processing in and from S104. That is, in this case, the elements of the differential value string X ranging from the element $X_i$ to the element $X_{i+N}$ are read but disregarded, so that the recognition of the magnetic ink characters corresponding to the element $X_i$ to the elements $X_{i+N}$ is omitted.

In this manner, when carrying out again the recognition processing of the magnetic ink characters according to the reacquired detected signal data, the magnetic ink character reading apparatus 10 may omit the recognition processing in the already-recognized portion. This makes it possible for the magnetic ink character reading apparatus 10 to reduce its processing load when executing again the recognition of the magnetic ink characters according to the reacquired detected signal data.

Figure 16:
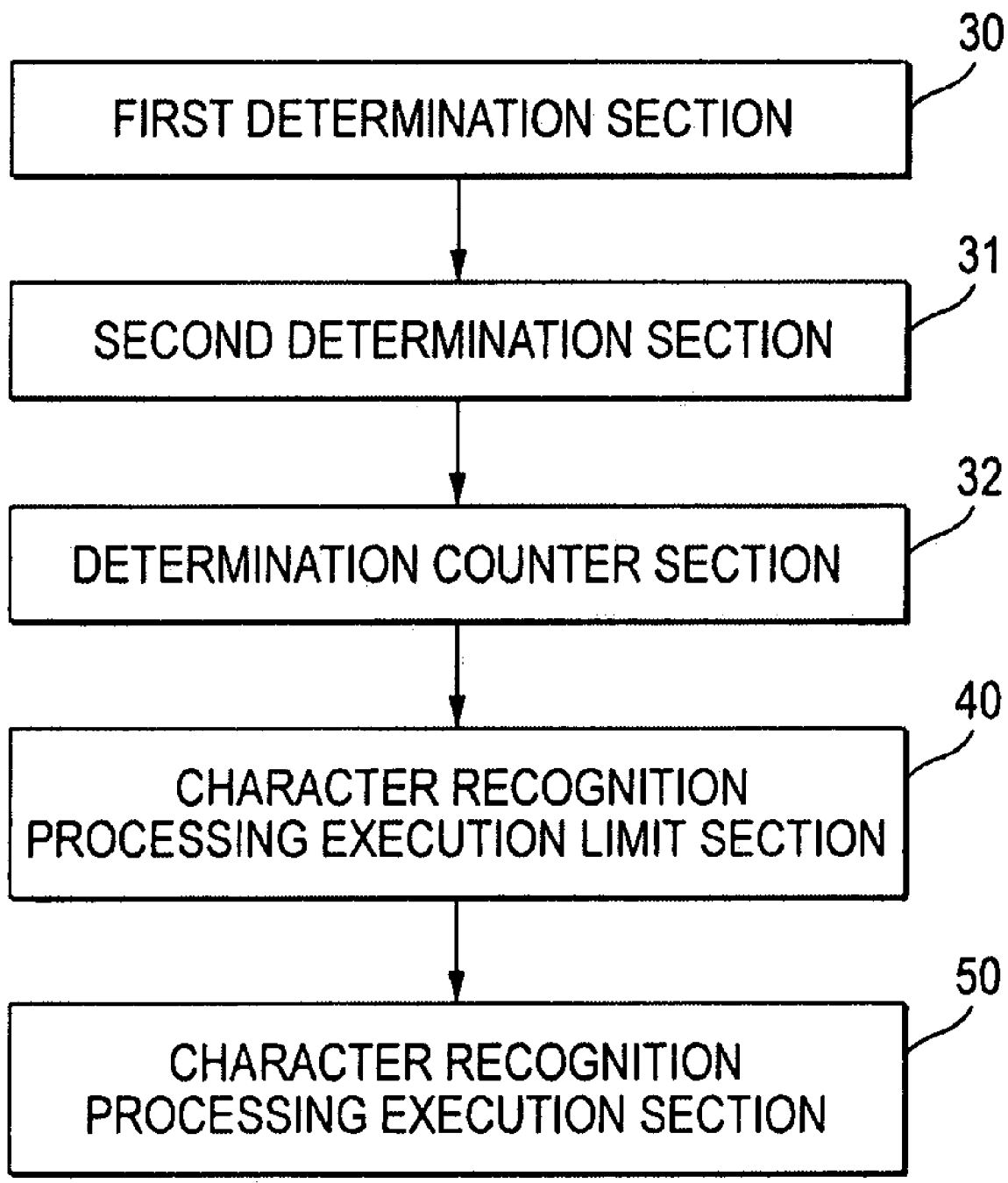
FIG. 16 is a functional block diagram of the magnetic ink character reading apparatus according to the embodiment of the invention.

Next, description will be predetermined below of functions which can be realized by the magnetic ink character reading apparatus 10. FIG. 16 is a block diagram which, of functions to be realized by the magnetic ink character reading apparatus 10, shows mainly the functions relating to the present invention. As shown in FIG. 16, the magnetic ink character reading apparatus 10 includes a first determination section 30, a second determination section 31, a determination counter section 32, a character recognition processing execution limit section 40, and a character recognition processing execution section 50 as the functions thereof. These function blocks can be realized in such a manner that a program, which allows the magnetic ink character reading apparatus 10 to carry out the processing shown, for example, in FIGS. 6 to 9 as well as FIGS. 14 and 15, is read out from the storage 12 and is performed by the controller 11.

The first determination section 30 is realized mainly by the controller 11. The first determination section 30 reads signal data sequentially from a signal data string corresponding to the output signals of the magnetic head 21 and determines whether the signal data correspond to a predetermined signal or not. The "signal data string corresponding to the output signals of the magnetic head 21" is a signal data string which can be obtained by sampling the output signals of the magnetic head 21. For example, the "signal data string corresponding to the output signals of the magnetic head 21" is the detected signal data (see FIG. 5) or the differential value string X (see FIG. 10). The "predetermined signal" is, for example, a signal (a peak signal of a positive polarity) which corresponds to an increase in the magnetic flux caused by the magnetic ink characters.

The second determination section 31 is realized mainly by the controller 11 and storage 12. The second determination section 31 determines whether the determination results each telling the disagreement of the signal data with the predetermined signal have been acquired successively over at least a predetermined number of signal data by the first determination section 30 or not. The "predetermined number" is, for example, a signal data number which corresponds to the time necessary to feed the sheet 24 by a distance equivalent to the pitch of the magnetic ink characters.

The determination counter section 32 is realized mainly by the controller 11 and storage 12. The determination counter section 32 counts the number of times (the count) "the successive acquisition of the determination results telling the disagreement of the signal data with the predetermined signal over at least a predetermined number of signal data" has been confirmed by the second determination section 31, and also stores the count results therein.

The character recognition processing execution section 50 is realized mainly by the controller 11 and storage 12 The character recognition processing execution section 50, based on a signal data string corresponding to the output signals of the magnetic head 21, performs a character recognition processing for recognizing the magnetic ink characters printed on the sheet 24.

The character recognition processing execution limit section 40 is realized main by the controller 11 and storage 12. The character recognition processing execution limit section 40, based on the count results obtained by the determination counter section 32, limits the execution of the character recognition processing to be performed by the character recognition processing execution section 50.

Now, description will be predetermined below in more detail of the functions of the character recognition processing execution limit section 40 and character recognition processing execution section 50. The character recognition processing execution limit section 40 and character recognition processing execution section 50, for example, have such functions as shown in FIG. 17.

Figure 17:
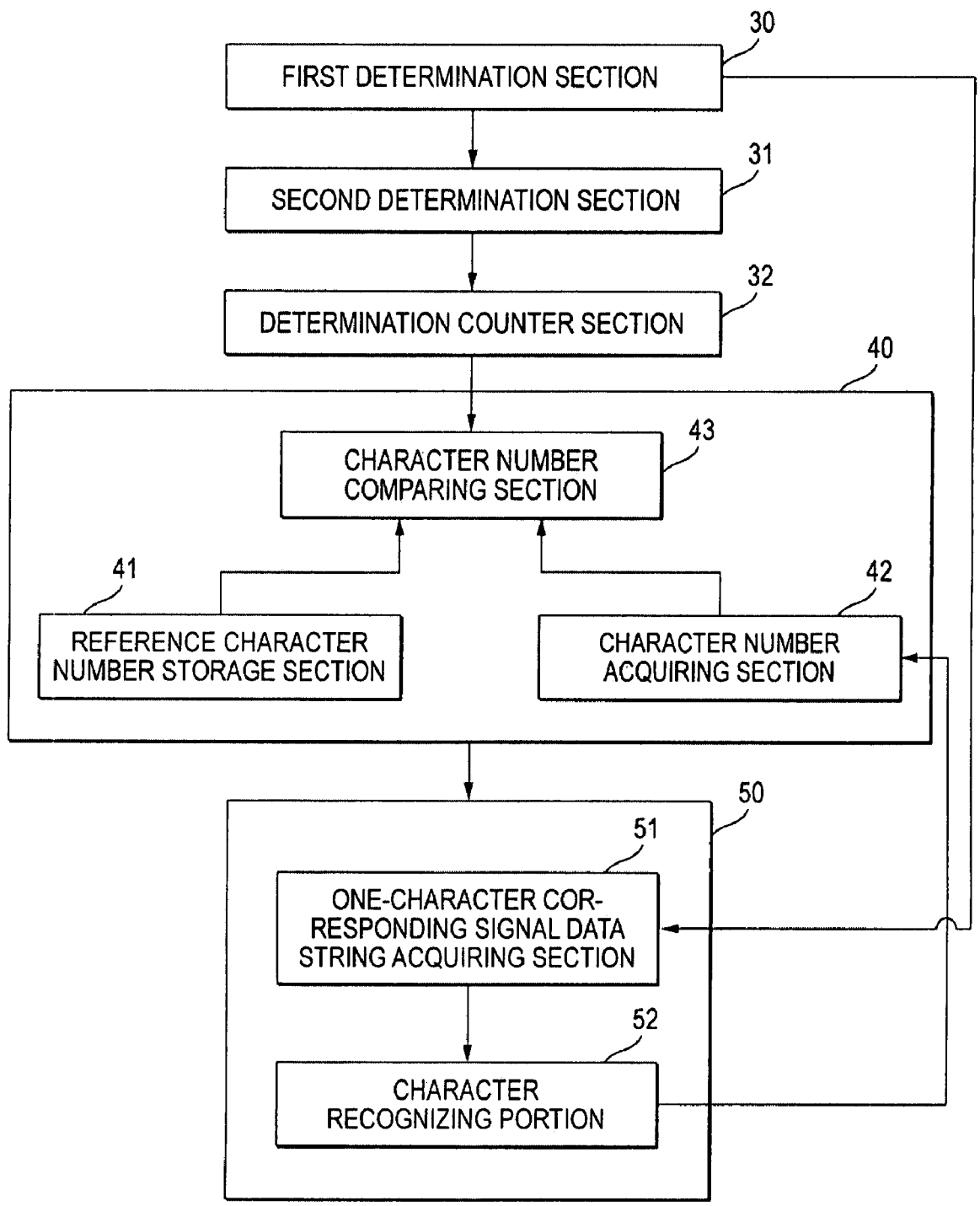
FIG. 17 is a functional block diagram of a determination section, a character recognition processing execution limit section and a character recognition processing execution section included in the magnetic ink character reading apparatus shown in FIG. 16.

As shown in FIG. 17, the character recognition processing execution section 50 includes a one-character-corresponding signal data string obtaining portion 51 and a character recognizing portion 52.

The one-character-corresponding signal data string obtaining portion 51 is realized mainly by the controller 11. The one-character-corresponding signal data string acquiring section 51, based on the determination result by the first determination section 30, acquires a part of the signal data string as a one-character-corresponding signal data string. For example, when the first determination section 30 determines that any one of the signal data corresponds to a predetermined signal, one-character-corresponding signal data string acquiring section 51 acquires a predetermined number of signal data following the current signal data as a one-character-corresponding signal data string. Here, "a predetermined number" is, for example, the number of signal data corresponding to the time necessary to feed the sheet 24 by a distance equivalent to the pitch of the magnetic ink characters. And, the term "one-character-corresponding signal data string" means, for example, the one-character-corresponding data that is extracted from the detected signal data, or the attentional differential value string Y (see FIG. 10).

The character recognizing portion 52 is realized mainly by the controller 11. The character recognizing portion 52 recognizes a magnetic ink character which corresponds to one-character-corresponding signal data string. The character recognizing portion 52 compares the one-character-corresponding signal data string with the reference data strings of the respective ink characters to thereby recognize the magnetic ink character that corresponds to the one-character-corresponding signal data string. For example, the character recognizing portion 52 calculates a similarity between the one-character-corresponding signal data string and the reference data strings of the respective magnetic ink characters to thereby recognize a magnetic ink character having the highest similarity as a magnetic ink character corresponding to the one-character-corresponding signal data string. The term "the reference data string of the magnetic ink characters" is used, for example, the reference value string P (see FIG. 10), or the reference differential value string Q (see FIG. 10).

Also, as shown in FIG. 17, the character recognition processing execution section 40 includes a reference character storage section 41, a character number acquiring section 42 and a character number comparing section 43.

The reference character storage section 41 is realized by the storage 12. The reference character storage section 41 stores the number of times (count) and the reference character number in correspondence with each other. The reference character storage section 41 stores, for example, such a reference character number table as shown in FIG. 12.

The character number acquiring section 42 is realized mainly by the controller 11. The character number acquiring section 42 acquires the character number that is recognized by the character recognizing portion 52. For example, the character number acquiring section 42, each time a character is recognized by the character recognizing portion 52, increases a numerical value (for example, the variable "c" in the processing shown in FIG. 6 or in FIG. 15 or in FIGS. 7 to 9) to be stored in the storage 12, thereby counting the number of characters that are recognized by the character recognizing portion 52. Also, for example, the character number acquiring section 42 acquires the number of characters recognized by the character recognizing portion 52 from the recognition result of the character recognizing portion 52 stored in the storage 12 (for example, the variable "s" in the processing shown in FIG. 6 or 7, or in FIG. 15, or in FIGS. 7 to 9).

The character number comparing section 43 is realized mainly by the controller 11. The character number comparing section 43 compares the result acquired by the character number acquiring section 42 with the reference character number that is stored in the reference character number storage section 41 in correspondence with the number of times counted by the determination counter section 32.

In this case, the character recognition processing execution limit section 40, according to the comparison result by the character number comparing section 43, limits (for example, stops) the execution of the character recognition processing by the character recognition processing execute section 50.

According to the structure shown in FIG. 17, each time the second determination section 31 determines that "the determination results each telling the disagreement of the signal data with the predetermined signal have been acquired successively over at least a predetermined number of signal data", it is determined whether the number of characters recognized up to the then time is right in the light of the format of the magnetic ink character string printed on the sheet 24 or not. And, when the recognized character number is found right, the character recognition processing is continued; and, when the recognized character number is found not right, the execution of the character recognition processing is limited. As a result of this, when the magnetic ink character string is not in part printed or is printed faint, it can be gathered at a relatively early stage that the recognition result does not conform to a predetermined format, thereby being able to prevent the character recognition processing from being performed uselessly.

Figure 18:
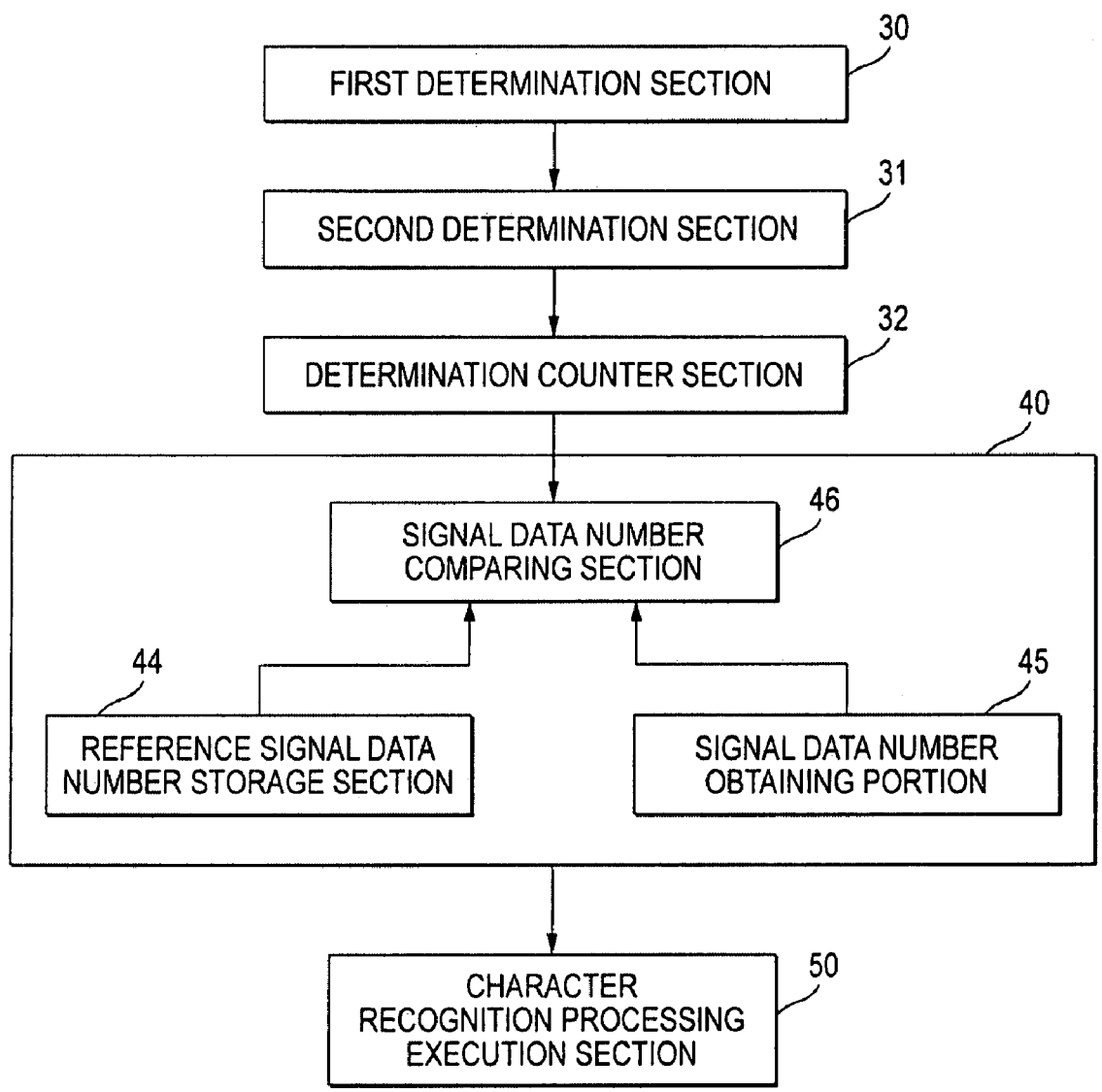
FIG. 18 is a functional block diagram of a modification of the determination section, character recognition processing execution limit section and character recognition processing execution section included in the magnetic ink character reading apparatus shown in FIG. 16.

The character recognition processing execution limit section 40 may also have such a function as shown in FIG. 18. As shown in FIG. 18, in this case, the character recognition processing execution limit section 40 includes a reference signal data number storage section 44, a signal data number acquiring section 45 and a signal data number comparing section 46.

The reference signal data number storage section 44 is realized by the storage 12. The reference signal data number storage section 44 stores the determination count and reference signal data number in correspondence with each other. The reference signal data number storage section 44 stores, for example, such a reference element number table as shown in FIG. 13.

The signal data number acquiring section 45 is realized mainly by the controller 11. When the second determination section 31 determines that "the determination results each telling the disagreement of the signal data with the predetermined signal have been acquired successively over at least a predetermined number of signal data", the signal data number acquiring section 45 acquires the number of signal data ranging from the leading signal data of the signal data string or a preset signal data thereof to the signal data that has a preset relation with at least the predetermined number of signal data. The "preset signal data" is, for example, the first signal data which is determined for the first time by the first determination section 30 that it corresponds to the predetermined signal. The "signal data having a preset relation with at least the predetermined number of signal data" is any one of at least the predetermined number of signal data and, more specifically, the leading signal data of at least the predetermined number of signal data.

The signal data number comparing section 46 is realized mainly by the controller 11. The signal data number comparing section 46 compares the result acquired by the signal data number acquiring section 45 with the reference signal data number which is stored in the reference signal data number storage section 44 in correspondence with the determination count counted by the determination counter section 32.

In this case, the character recognition processing execution limit section 40, according to the comparison result by the signal data number comparing section 46, limits (for example, stops) the execution of the character recognition processing by the character recognition processing execute section 50.

According to the structure shown in FIG. 18, each time the second determination section 31 determines that "the determination results each telling the disagreement of the signal data with the predetermined signal have been acquired successively over at least a predetermined number of signal data", it is determined whether, for example, the number of signal data ranging from the leading signal data of the signal data string to the leading signal data of at least the predetermined number of signal data is right in the light of the format of the magnetic ink character string printed on the sheet 24 or not. And, when the current signal data number is found right, the character recognition processing is continued; and, when the current signal data number is found not right, the execution of the character recognition processing is limited. As a result of this, when the magnetic ink character string is not in part printed or is printed faint, it can be gathered at a relatively early stage that the recognition result does not conform to a predetermined format, thereby being able to prevent the character recognition processing from being performed uselessly.

Figure 19:
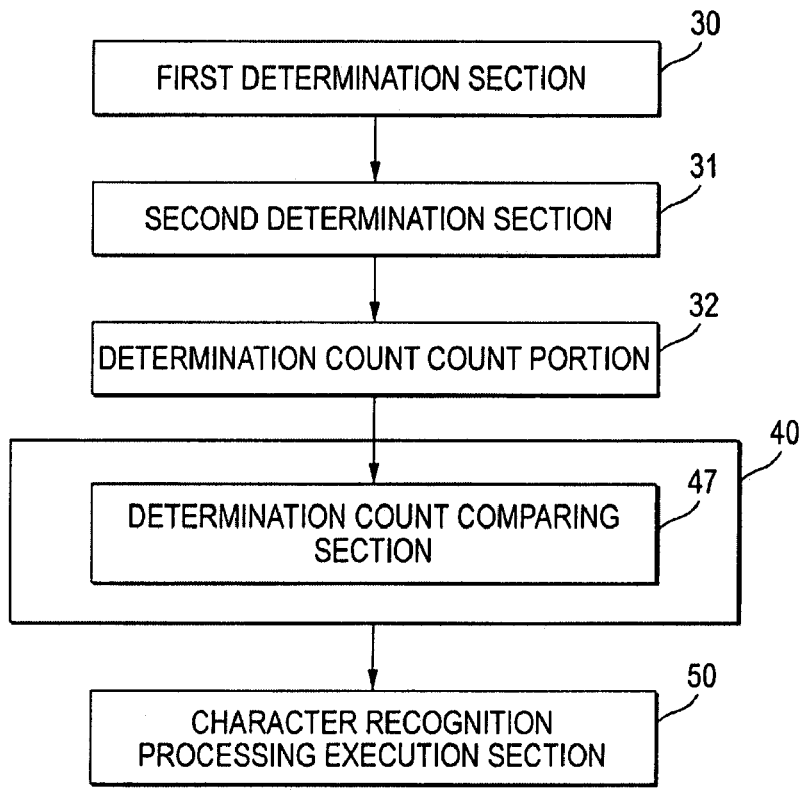
FIG. 19 is a functional block diagram of another modification of the determination section, character recognition processing execution limit section and character recognition processing execution section included in the magnetic ink character reading apparatus shown in FIG. 16.

Also, the character recognition processing execution limit section 40 may also have such a function as shown in FIG. 19.

In this case, the checking operations to be performed by the first and second determination sections 30 and 31 as well as the counting operation to be performed by the determination to counter section 32 are to be performed before execution of the character recognition processing by the character recognition processing execute section 50.

As shown in FIG. 19, in this case, the character recognition processing execution limit section 40 includes a determination count comparing section 47. The determination count comparing section 47 compares the count result acquired by the determination counter section 32 with a predetermined reference count. The count result obtained by the determination counter section 32 is, for example, the variable "b'" in the processing shown in FIG. 14; and, the "predetermined reference count" is, for example, the constant B in the processing shown in FIG. 14.

In this case, the character recognition processing execution limit section 40, according to the comparison result obtained by the determination count comparing section 47, limits (for example, stops) the start of the execution of the character recognition processing by the character recognition processing execute section 50.

According to the structure shown in FIG. 19, it is determined whether the number of times (count), at which a state not to output a predetermined signal from the magnetic head 21 happens continuously for a predetermined period or longer, is right in the light of the format of the magnetic ink character string printed on the sheet 24 or not. And, when the number of times is found right, the character recognition processing is started; and, when the number of times is found not right, the start of the character recognition processing is limited. As a result of this, when the magnetic ink character string is not in part printed or is printed faint, it can be gathered at a relatively early stage that the recognition result does not conform to a predetermined format, thereby being able to prevent the character recognition processing from being performed uselessly.

As described above, according to the magnetic ink character reading apparatus 10, when the magnetic ink character string is not in part printed or is printed faint, it can be gathered at a relatively early stage that the recognition result does not conform to a predetermined format, thereby being able to prevent the character recognition processing from being performed uselessly. This can reduce the processing load of the magnetic ink character reading apparatus 10.

However, the present invention is not limited to the above-mentioned embodiment.

For example, the printing section 15 is not always indispensable.

Also, for example, the magnetic ink character to be printed on the sheet 24 may also be a magnetic ink character of formats other than the format defined by JIS X9002.

Figure 9:
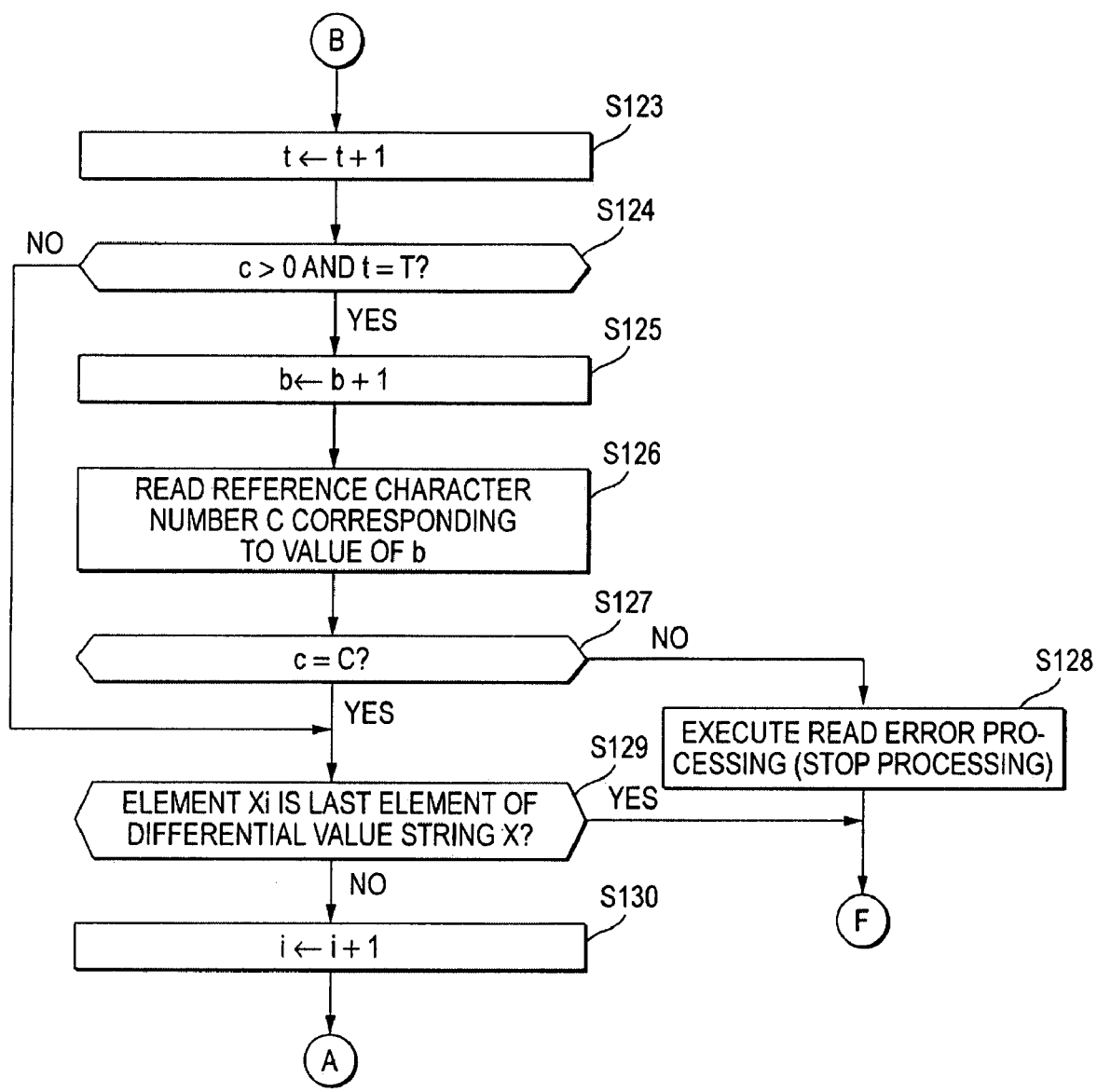
FIG. 9 is a flow chart of a processing to be performed by the magnetic ink character reading apparatus shown in FIG. 1.
Figure 10:
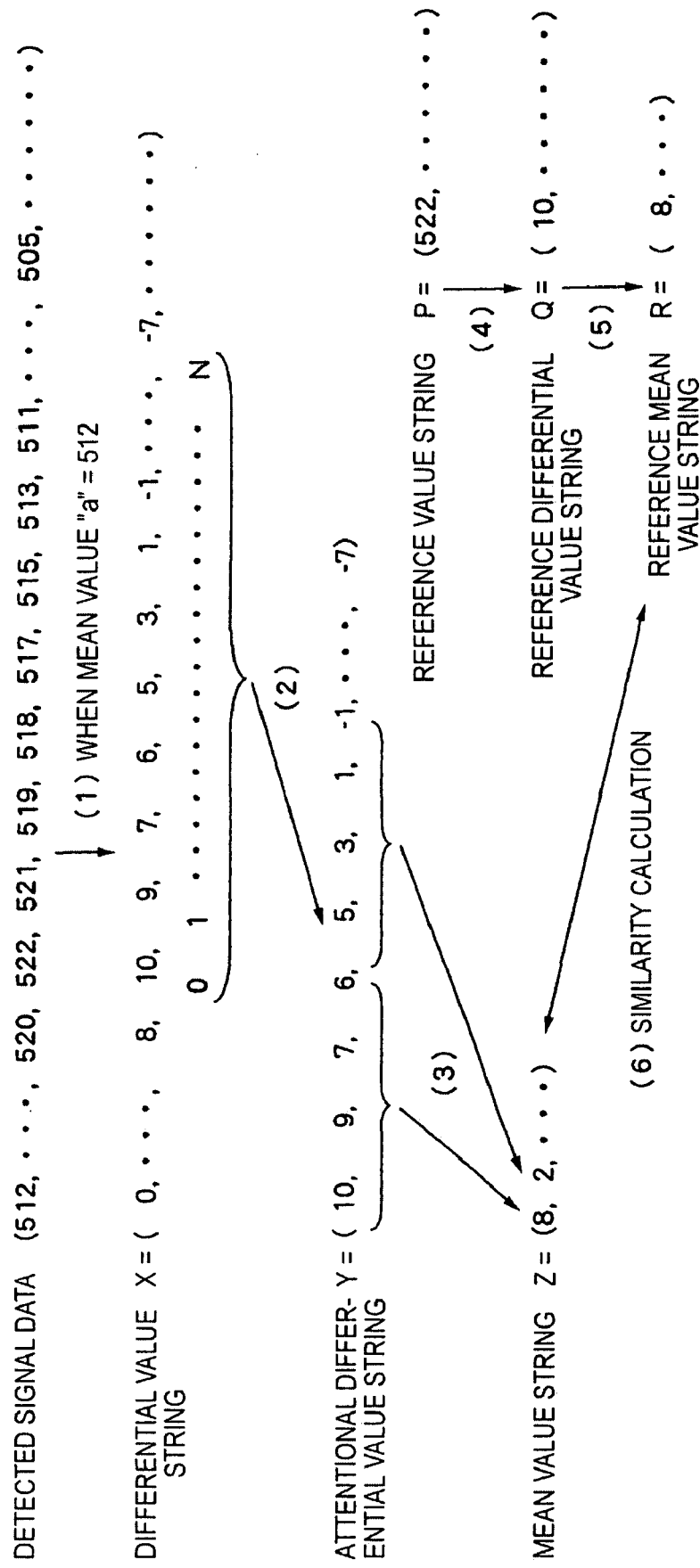
FIG. 10 is an explanatory view of a processing to be performed by the magnetic ink character reading apparatus shown in FIG. 1.

Also, for example, in S115 shown in FIG. 8, in S128 shown in FIG. 9 and in S214 shown in FIG. 14, there may also be performed a read error processing (a retry processing) similar to the read error processing in S117 shown in FIG. 8.

Further, for example, in S117 shown in FIG. 8, there may also be performed a similar read error processing (a stop processing) to the read error processing in S115 shown in FIG. 8.

And, for example, in S104 shown in FIGS. 6 and 15, also when the correspondence of the element Xi to the peak points of a positive polarity has never been confirmed, that is, also when the peak points of a positive polarity have never been detected, there may also be performed a similar read error processing (a stop processing) to the read error processing in S115 shown in FIG. 8. In this case, a similar error processing (a retry processing) to S117 shown in FIG. 8 should not be performed. When the peak points of a positive polarity are not detected, there is a high possibility that the sheet 24 is inserted reversely and, therefore, there is a high possibility that the retry processing can be performed uselessly. In view of this, as described above, when the retry processing is not performed, the useless execution of the retry processing can be prevented, which makes it possible to reduce the processing load of the magnetic ink character reading apparatus 10.

Also, for example, it may be determined whether predetermined symbols (for example, strokes 10~13) are present at predetermined position of the character string or not and, according to the determination result, a similar read error processing to S115 or S117 shown in FIG. 8 may be performed.

Also, for example, the magnetic ink character reading apparatus 10 may also be structured such that it can repeat the retry processing two or more times. In this case, when the retry processing is repeated a predetermined number of times, the magnetic ink character reading apparatus 10 may deter the execution of the retry processing and stop the reading of the magnetic ink characters.

What is claimed is:

1. A magnetic ink character reading apparatus comprising:
a magnetic head that reads a variation in magnetic flux caused by a magnetic ink character string recorded on a recording medium and outputs a signal in accordance with the read variation in magnetic flux;
a character recognition section that recognizes the magnetic ink character string by performing a character recognition processing based on a signal data string included in the signal output from the magnetic head;
a first determination section that reads out signal data sequentially from the signal data string and determines whether or not the read signal data conform with a predetermined signal;
a second determination section that determines whether or not the first determination section determines that the read signal data does not conform with the predetermined signal over at least a predetermined number of signal data consecutively;
a determination number counting section that counts a number of times the second determination section determines that the first determination section determines that the read signal data does not conform with the predetermined signal over at least the predetermined number of signal data consecutively; and
a character recognition processing execution limit section that controls the character recognition section to limit performing the character recognition processing based on the number counted by the determination number counting section.

2. The magnetic character reading apparatus according to claim 1 further comprising a signal data string acquiring section that acquires a part of the signal data string as a one-character corresponding signal data string based on the determination result of the first determination section,
wherein the character recognition section recognizes the magnetic ink character string by performing the character recognition processing for the signal data string corresponding to the one-character corresponding signal data string,
wherein the character recognition processing execution limit section includes:
a reference character number storage section that stores the number of times of the determination counted by the determination number counting section and a reference character number in correspondence with each other;
a character number acquiring section that acquires the number of characters recognized by the character recognition section; and
a character number comparing section that compares the result acquired by the character number acquiring section with the reference character number to be stored into the reference character number storage section, and wherein the character recognition processing execution limit section controls the character recognition section to limit performing the character recognition processing based on the comparison result of the character number comparing section.

3. The magnetic ink character reading apparatus according to claim 1, wherein the character recognition processing execution limit section includes;

a reference signal data number storage section that stores the number of times of the determination counted by the determination number counting section and a reference signal data number in correspondence with each other;

a signal data number acquiring section that, when the second determination section determines that the first determination section determines that the read signal data does not conform with the predetermined signal over at least the predetermined number of signal data consecutively, acquires a number of signal data ranging from a leading signal data or a predetermined signal data of the signal data string to signal data having a predetermined relationship with the predetermined signal data; and a signal data number comparing section that compares (1) the number of signal data acquired by the signal data number acquiring section with (2) the reference signal data number to be stored into the reference signal data number storage section in correspondence with the number of times of the determination counted by the determination number counting section, and wherein the character recognition processing execution limit section controls the character recognition section to limit performing the character recognition processing based on the comparison result of the signal data number comparing section.

4. The magnetic ink character reading apparatus according to claim 1, wherein the determinations by the first and the second determination sections and the counting by the determination number counting section are performed before the character recognition processing by the character recognition section, wherein the character recognition processing execution limit section includes a determination count comparing section that compares (1) the count result by the determination number counting section with (2) a predetermined reference count, and wherein the character recognition processing execution limit section controls the character recognition section to limit performing the character recognition processing based on the comparison result by the determination count comparing section.

5. A method for controlling a magnetic ink character reading apparatus including:

a magnetic head that reads a variation in magnetic flux caused by a magnetic ink character string recorded on a recording medium and outputs a signal in accordance with the read variation in magnetic flux; and a character recognition section that recognizes the magnetic ink character string by performing a character recognition processing based on a signal data string included in the signal output from the magnetic head, wherein the method comprises:

a first determination step that reads out signal data sequentially from the signal data string and determines whether or not the read signal data conform with a predetermined signal;

a second determination step that determines whether or not the first determination section determines that the read signal data does not conform with the predetermined signal over at least a predetermined number of signal data consecutively;

a determination number counting step that counts a number of times the second determination section determines that the first determination section determines that the read signal data does not conform with the predetermined signal over at least the predetermined number of signal data consecutively; and a character recognition processing execution limit step that controls the character recognition section to limit performing the character recognition processing based on the number counted by the determination number counting section.

* * * * *